US012565387B2

(12) United States Patent (10) Patent No.: US 12,565,387 B2
Carrasco (45) Date of Patent: Mar. 3, 2026

(54) SUCTION UNIT AND SUCTION DEVICE

(71) Applicant: A O FORMAFLON SWISS AG,
Schocherswil (CH)

(72) Inventor: César Carrasco, Schocherswil (CH)

(73) Assignee: A O FORMAFLON SWISS AG,
Schocherswil (CH)

( * ) Notice: Subject to any disclaimer, the term of this
patent is extended or adjusted under 35
U.S.C. 154(b) by 1011 days.

(21) Appl. No.: 17/638,382

(22) PCT Filed: Sep. 7, 2020

(86) PCT No.: PCT/EP2020/074978
§ 371 (c)(1),
(2) Date: Feb. 25, 2022

(87) PCT Pub. No.: WO2021/048070

PCT Pub. Date: Mar. 18, 2021

(65) Prior Publication Data

US 2022/0297954 A1 Sep. 22, 2022

(30) Foreign Application Priority Data

Sep. 10, 2019 (EP) .................................... 19196589
Nov. 8, 2019 (EP) .................................... 19208051
Jan. 15, 2020 (EP) .................................... 20152029

(51) Int. Cl.
*B65G 47/91* (2006.01)
*B25J 15/06* (2006.01)

(52) U.S. Cl.
CPC ......... *B65G 47/911* (2013.01); *B25J 15/0683*
(2013.01); *B65G 2201/0202* (2013.01); *B65G*
*2201/022* (2013.01)

(58) Field of Classification Search
CPC .......... B65G 47/911; B65G 2201/0202; B65G
2201/022; B25J 15/0683; B25J 15/06;
B25J 15/0616; H01L 21/6838
See application file for complete search history.

(56) References Cited

U.S. PATENT DOCUMENTS 5,636,887 A 6/1997 Petropoulos et al.
6,604,888 B2 * 8/2003 Dolan ................... E01F 15/146
404/6

(Continued)

FOREIGN PATENT DOCUMENTS

DE 35 16941 A1 11/1986
DE 9208417 U1 10/1993

(Continued)

OTHER PUBLICATIONS

Dec. 7, 2020 International Search Report issued in International
Patent Application No. PCT/EP2020/074978.

(Continued)

*Primary Examiner* — Stephen A Vu
(74) *Attorney, Agent, or Firm* — GREENBLUM &
BERNSTEIN, P.L.C.

(57) ABSTRACT

The suction unit (10), which serves for suctioning an object
(P) according to Bernoulli's principle, comprises a suction
body (16) with an adjoining suction plate (11), which
adjoining suction plate (11) has a front side facing away
from the suction body (16), and comprises at least one entry
channel (13), through which a gaseous medium is introduc-
ible through the suction body (16) to the front side of the
suction plate (11) into a deflection channel (110), which
deflection channel (110) is delimited on one side by the front
side of the suction plate (11) and on another side by a
deflection head (121) of a deflection unit (12) or which
deflection channel (110) is delimited on one side by the front
side of the suction plate (11) and on another side by the (Continued)

Figure 1A:
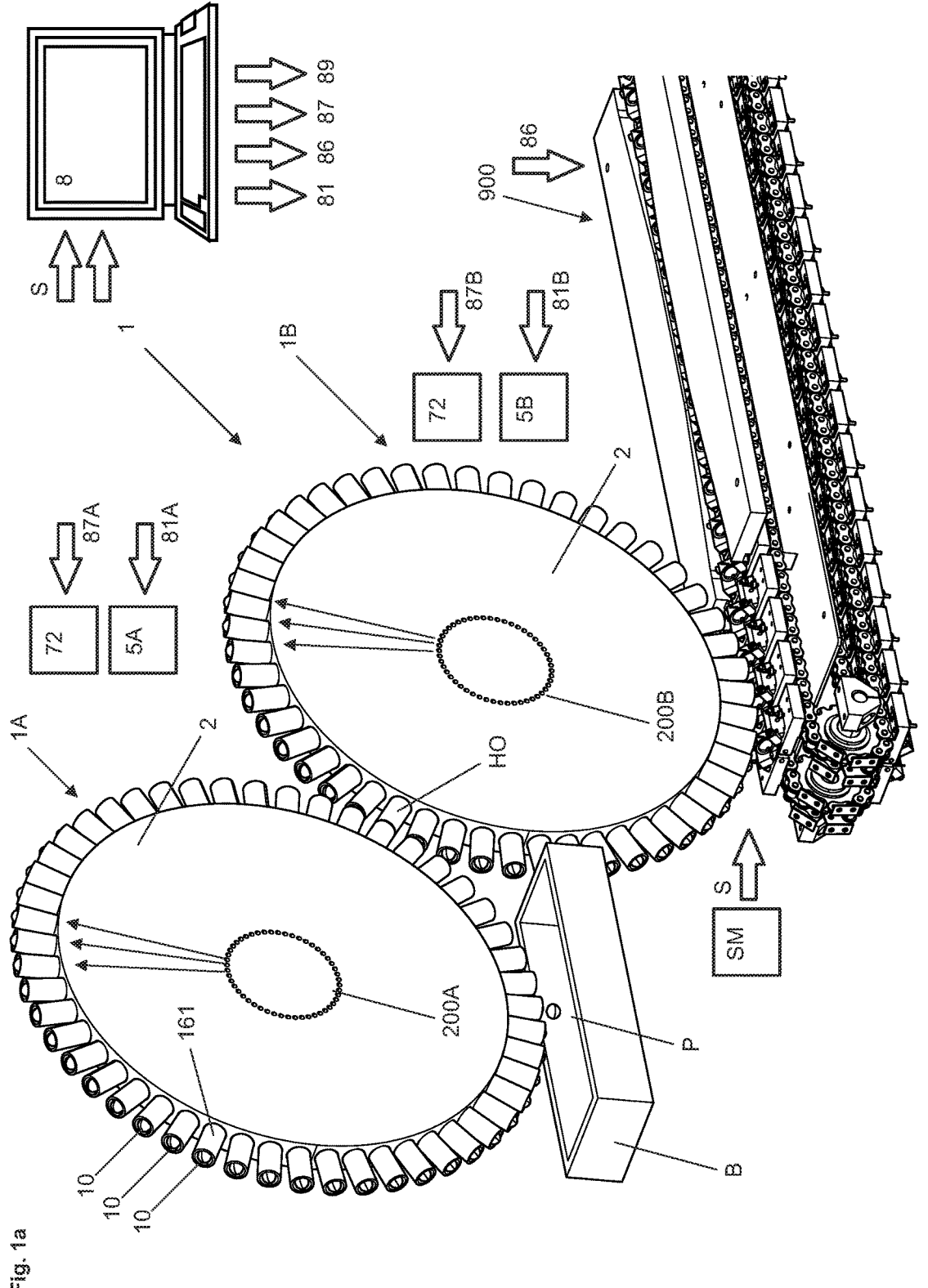

object (P) when the object (P) is suctioned, and through which deflection channel (110) the gaseous medium is guidable to the outside. According to the invention the suction body (16) is integrally or detachably connected to a suction basket (161) whose inner side (1619) adjoins the suction plate (111) or whose inner side (1619) is spaced apart from the suction plate (111), wherein the suction basket (161) encloses a receiving channel (1600) which has a channel opening (1610) that is dimensioned in such a way that individual objects (P) can be introduced into the receiving channel (1600) or into at least one recess (1611, 1612) on the underside of the suction basket (161).

12 Claims, 17 Drawing Sheets

(56) References Cited

U.S. PATENT DOCUMENTS

| | | | | |
|---|---|---|---|---|
| 7,597,370 | B2 * | 10/2009 | Tanae | B65G 47/91 294/64.3 |
| 9,381,652 | B2 * | 7/2016 | Abe | B25J 15/0616 |
| 10,643,881 | B2 * | 5/2020 | Iwasaka | H01L 21/6838 |
| 11,037,809 | B2 * | 6/2021 | Hung | H01L 21/67766 |
| 11,541,554 | B2 * | 1/2023 | Nakayama | B25J 15/0683 |
| 2007/0131660 | A1 | 6/2007 | Tanae | |
| 2020/0164527 | A1 * | 5/2020 | Iwasaka | H01L 21/6838 |

FOREIGN PATENT DOCUMENTS

| | | | |
|---|---|---|---|
| DE | 20 2006 016 833 | U1 | 4/2007 |
| DE | 10 2008 023 907 | A1 | 12/2009 |
| EP | 2554500 | A1 | 2/2013 |
| EP | 3530422 | A1 | 8/2019 |
| FR | 1 391 432 | A | 3/1965 |
| JP | 850-118147 | A | 9/1975 |
| JP | 858-141536 | A | 8/1983 |
| JP | 2010-114108 | A | 5/2010 |
| JP | 2015-179741 | A | 10/2015 |
| JP | 2019-055439 | A | 4/2019 |
| WO | 2010/094343 | A1 | 8/2010 |
| WO | 2017017750 | A1 | 2/2017 |
| WO | 2019/049890 | A1 | 3/2019 |

OTHER PUBLICATIONS

Dec. 4, 2020 International Search Report issued in International Patent Application No. PCT/EP2020/074977.
U.S. Appl. No. 17/636,741, filed Feb. 18, 2022 in the name of Cesar Carrasco.

* cited by examiner

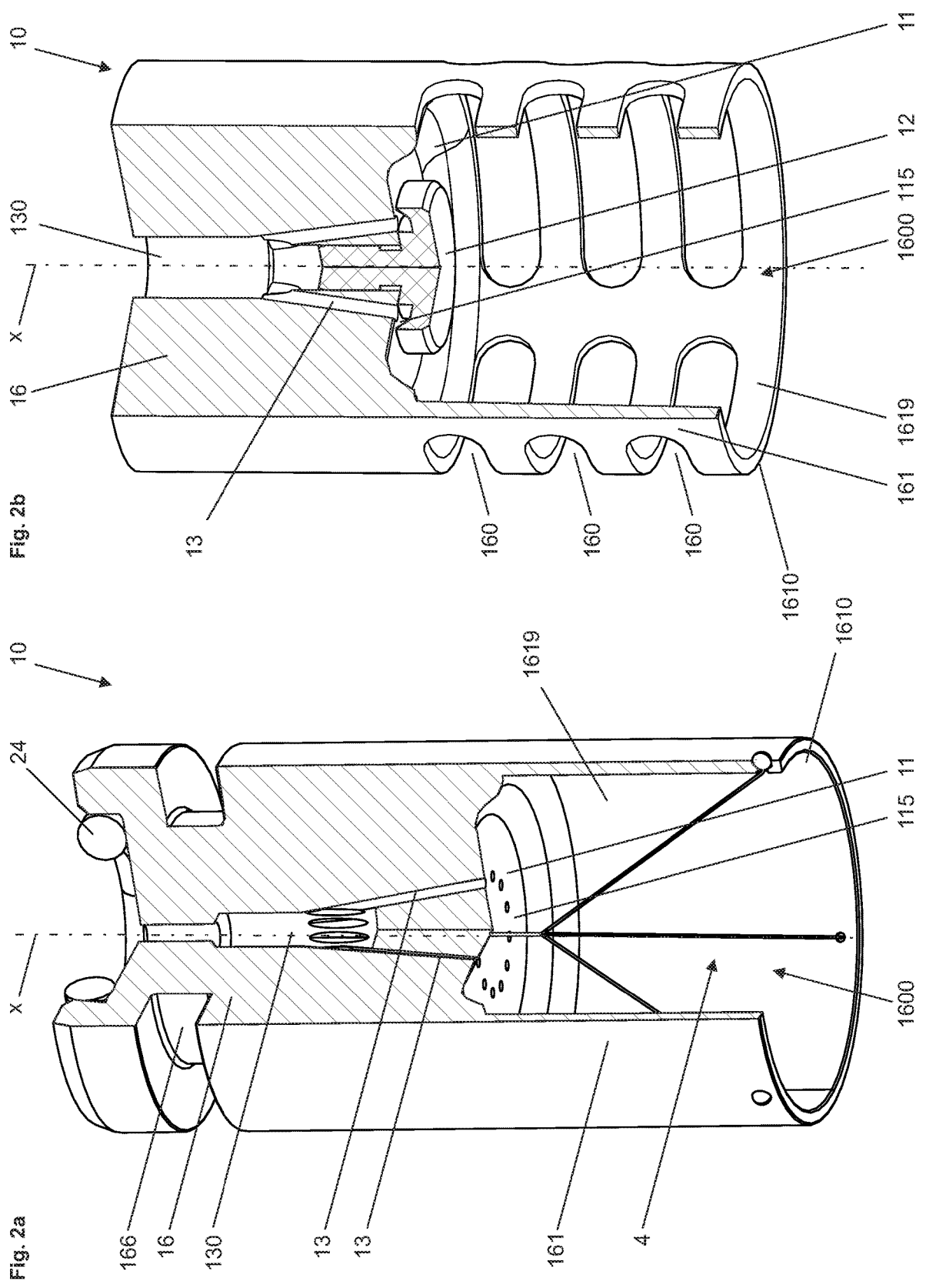

SUCTION UNIT AND SUCTION DEVICE

The invention relates a suction unit operating according to the Bernoulli principle and a suction device with at least one such suction unit, by means of which objects, in particular isolated objects can be picked up from a working process and released again.

In numerous industrial applications, especially in the food industry, products or objects with predetermined dimensions must be provided for packaging. Food products such as bread, sausages or cheese are often divided into thin slices and packaged. In other technical areas, for example, plate-shaped workpieces such as wafers, boards, foils, paper, wood veneer and the like are produced and prepared for further processing.

The disc-shaped objects are to be picked up gently at a pick-up point and returned unchanged, i.e., without deformation, damage or contamination, at a delivery point. Instead of mechanical gripping tools, suction devices are therefore often used, which preferably work according to the Bernoulli principle. Mechanical gripping tools, on the other hand, are used for handling objects that do not have flat surfaces.

According to DE202006016833U1, Bernoulli suction units usually consist of an axially symmetrical base body through which a gaseous medium (compressed air, inert gas, etc.) flows from at least one nozzle in the direction of an object to be lifted. When hitting the object, the gaseous medium between the object unit and the base body of the suction unit is deflected in a radial direction at high flow velocity. According to the Bernoulli equation, the kinetic energy and the specific pressure energy are always constant. Hence, the area of high flow velocity, a correspondingly reduced pressure results, by means of which the object is suctioned.

In order to reduce the pressure force counteracting the suction force, which is created when the media flow hits the object, in known suction units the media flow is deflected in a radial direction before hitting the object. A plate-shaped deflector unit is held in front of the incoming gas so that it is deflected radially through an annular gap and guided away laterally. The DE202006016833U1 shows suction units where the plate-shaped deflection unit is integrally connected to the base body. The production of the suction unit or the base body with the deflection unit integrated in one piece is therefore very costly.

It should also be noted that, depending on the contour and surface quality of the object unit, disturbances or turbulence can occur in the air flow, which can increase the pressure between the suction unit and the object unit at certain points. Objects may not be held securely and may partially detach from the suction unit. This leads to problems especially when objects are to be transported and deposited piece by piece with high cycle rates and interventions to correct incorrectly deposited objects are not possible.

It was also found that the use of commercially available Bernoulli suction units poses few problems for relatively rigid, light, panel-shaped objects. Unstable objects, on the other hand, are at risk of either being damaged or not being handled in a process-stable manner. If objects are not dimensionally stable as a result of the forces acting on them and can be made to vibrate, for example, their contours change continuously and, as a result, the flow and the forces acting on the object change. Depending on the damping properties of the overall system, thin and flexible objects in particular will show dynamic behaviour which prevents a stable handling process. According to the DE202006016833U1, a functionally reliable separation of thin, flexible objects is practically impossible with conventional Bernoulli suction units. To solve this problem, the DE202006016833U1 is equipped with an orifice plate which separates the media flow from the object unit and channels it between the orifice plate and the body of the suction unit. The use of such an orifice also has disadvantages. On the one hand, the suction power can be reduced and on the other hand, suction units equipped with an orifice plate tend to accumulate dirt particles, which can be removed again with the appropriate effort.

According to the DE202006016833U1, even the handling of flat objects can cause difficulties, which is why other gripping or holding devices have been used until now for the handling of non-flat objects.

It should also be noted that with known suction units the release of the held objects is not precise. To dispense an object unit, the media flow is interrupted, whereby the suction force is reduced relatively slowly, and the object is released more or less quickly. In addition, the objects are deposited at the delivery point by gravity. This means that the delivery is not precise in terms of time and, if necessary, location. Due to the delayed delivery of the transported objects, the cycle frequencies with which the objects are transported are also limited accordingly.

It should also be noted that when objects are discharged by removing the suction force, typically the periphery of the held object unit is first released and detached from the suction unit by the force of gravity. With flexible objects, this can lead to bending or even rolling of the object unit. To enable controlled delivery, the suction unit must be aligned accordingly at the delivery point before the suction is released. To avoid this problem, the suction unit is aligned horizontally and brought close to the delivery point, but this results in significant restrictions in the handling of the objects. To achieve an orderly delivery of objects, machines and robots are therefore required that can perform complex movements. The processes for handling the objects must be adapted accordingly or restricted to these types of handling.

As mentioned, conventional Bernoulli suction units are only used for plate-shaped objects where flat contact is possible. For other objects, mechanical gripping tools are usually used, but they regularly damage the objects.

In particular, it is hardly possible to pick up of very fine, possibly elongated, thin objects. In the field of surgery, therefore, conventional suction units are hardly suitable for manipulating objects, while impacts on the treated tissue must be avoided.

It should also be noted that the gaseous medium ejected by the suction units can cause turbulence in the surrounding area, which can have a disturbing effect on valuable or sensitive material. Powdery material in particular can be swirled and repelled.

In addition, dust particles can be sucked in, which contaminate the suction unit and require maintenance work.

Another disadvantage of known suction units is that they require high air pressure to operate, which means that powerful pumps must be provided.

The present invention is therefore based on the object of creating an improved suction unit which works according to the Bernoulli principle. Furthermore, an improved suction device with at least one such suction unit is to be created.

Inventive suction units shall allow picking up and in any controlled manner discharging objects, in particular individual product units, with any dimensions and any composition. Damage or disturbing deformation of the manipulated objects shall be avoided. For example, spherical or diskshaped objects should be able to be captured. It should also be possible to capture flat and flat objects in combination with each other. Preferably, at least one first object and then additionally a second object should be able to be captured, whereby the objects can have the same or different dimensions.

It should be possible to implement the suction units with a simpler basic body. For example, it should be possible to do without a plate-shaped deflection unit.

It shall be possible to pick up separated objects correctly at a pick-up point and deliver them to a delivery point with high cycle rates.

Disturbing effects on the manipulated objects and their surroundings caused by the gaseous medium used shall be avoided. Contamination of the suction units shall also be avoided. The suction units shall therefore also be advantageously applicable in difficult environments, particularly in medicine, especially in surgery, where high demands are imposed on the instruments.

It shall also be possible to clean and maintain the suction units easily and thoroughly.

The suction units shall be able to operate with high efficiency, so that only a minimum air pressure is required for their operation and simply designed compressed air devices can be used.

This task is solved with a suction unit and a suction device, which has the features mentioned in the claims. Advantageous designs of the invention are defined in further claims.

The suction unit, which serves for suctioning an object according to Bernoulli's principle, comprises a suction body, which has an adjoining suction plate, which adjoining suction plate has a front side facing away from the suction body, and comprises at least one entry channel, through which a gaseous medium is introducible through the suction body to the front side of the suction plate into a deflection channel, which deflection channel is delimited on one side by the front side of the suction plate and on another side by a deflection head of a deflection unit or which deflection channel is delimited on one side by the front side of the suction plate and on another side by the object when the object is suctioned, and through which deflection channel the gaseous medium is guidable to the outside.

According to the invention the suction body is integrally or detachably connected to a suction basket whose inner side adjoins the suction plate or whose inner side is spaced apart from the suction plate, wherein the suction basket encloses a receiving channel which has a channel opening that is dimensioned in such a way that individual objects can be introduced into the receiving channel or into at least one recess on the underside of the suction basket.

As described above, suction units of the prior art operating according to the Bernoulli principle are only used for holding flat objects. In the food industry in particular, the manipulation and gentle holding of objects, for example confectionery items, fruits and nuts or parts thereof, which do not have flat surfaces, are of particular importance. Such objects were previously gripped and manipulated with mechanical grippers. In surgery, for example, small objects such as needles and splinters often need to be grasped without interfering with the surrounding tissue. In particular, the tissue should not be contaminated. Furthermore, the penetration of impurities, such as tissue residues, dust and the like, into the suction unit should be avoided.

The suction basket provided according to the invention, which is provided adjacent to the suction plate or spaced apart from it or separated from it by isolated openings, can now suck objects with any regular or irregular shapes to the channel opening or suck them into the suction channel.

The suction basket causes the gaseous medium to flow around an sucked-in object. Even if an irregularly shaped body, such as a hazelnut, is sucked in, the gaseous medium flows through it at a high flow rate, which in turn creates a vacuum that can be used to hold the object securely.

The distance along which the gaseous medium flows at high speed is very long when a suction basket is used, possibly in conjunction with the suction bell described below, which is why a vacuum is achieved over a large area and with a high effect. Even when a suction basket is used, possibly in conjunction with the suction bell, a conventional fan can be used as a means of conveying the gaseous medium instead of a compressed air unit.

Optionally, the suction basket is provided with basket openings which ensure media flow even if the channel opening is completely or partially closed after an object has been sucked in. The basket openings can be arranged regularly or irregularly in a row or spaced apart in several rows.

The receiving channel has a channel opening which is designed in such a way that individual objects can be inserted through it into the receiving channel or can be fixed at the edge of the channel opening.

The dimensions of the preferably transparent suction basket, in particular length and diameter, or the dimensions of the channel opening, or the channel entrance of the suction channel are preferably adapted to the objects to be transported. The suction basket can therefore have, for example, a cylindrical shape, a conical shape, a shape with a rectangular or polygonal cross-section. The suction basket can also have combinations of said shapes and for example be conically shaped only on the outlet side. The suction channel can be regular, irregular, symmetrical or asymmetrical in shape, so that objects can be grasped in any position or only in a certain position. In the food industry, it may not matter how an object is oriented. In surgery or even in semiconductor technology, on the other hand, the orientation of an object may be mandatory. The length and width of the suction basket are selected so that an object can at least partially enter the channel opening or the channel entrance. The length of the suction basket can therefore be only a few millimetres or a few centimetres. For example, the dimensions of the suction basket are adapted to food objects, such as nuts, fruits, or parts thereof. If the suction basket is detachably mounted, a suitable suction basket can be mounted in each case. A surgeon will choose a suction basket that is adapted to the corresponding work process, tissue to be picked up or tools. The channel opening or the channel entrance is preferably adapted to the dimensions of the objects to be picked up and can, for example, be stepped.

A deflection unit with a deflection head is only used as an option if a negative pressure should always be ensured close to the suction plate. The deflection unit can be integrally connected to the suction body or can be inserted into it. For example, a mounting channel is provided into which a mounting element of a deflection head can be anchored, for example pressed or screwed in. In this case, the user can optionally retrofit the suction units with a deflection unit. Preferably, a mounting channel is provided which connects to an inlet channel for the gaseous medium, which inlet channel is closed off by the mounting element of the deflection unit.

The preferably axially symmetrical deflection head preferably has a flat surface or a circumferential groove-shaped depression on the side facing the suction plate, which preferably extends rounded towards the edge of the deflection head. In this embodiment, the axially symmetrical deflection unit has an at least approximately anchor-shaped cross section in a longitudinal section through the axis of rotation. The media flow is thus introduced into the deflection channel through the deflection head in a controlled manner.

In a further preferred embodiment, a plurality of, preferably six, entry channels are provided, which are preferably arranged at equal distances from one another. The entry channels preferably extend outwardly, for example like edges of a pyramid, inclined towards the suction plate and move steadily away from the central axis until they reach the front side of the suction plate. In this way, the media flow is already deflected. In addition, the entry channels can be cleaned relatively easily in the event of contamination. In principle, the entry channels can also run outward along a curve. For example, straight tubes or tubes running along a curve can be embedded in the suction body to create entry channels of any shape.

By the entry channels arranged inclined to the center axis, the inflowing medium is preferably evenly distributed against the inner wall of the suction basket, which is why a higher flow velocity and a corresponding pressure reduction is automatically ensured along the inner wall of the suction basket.

The inclined arrangement of the entry channels and the partial deflection of the gaseous medium already inside the suction basket and the conveyance of the gaseous medium in the direction of the inner wall of the suction basket allow the suction unit to be operated at reduced pressure, which is why a conventional fan can also be used as a means of conveying the gaseous medium instead of a compressed air unit. The pressure requirement can be further reduced by a higher number of preferably evenly distributed entry channels.

In another preferred embodiment, a plurality of outlet channels extend through the suction body to outlet openings at the front of the suction plate. As the objects are dispensed, the media flow through the entry channels is interrupted so that the suction is removed and the object is released from the suction unit. To accelerate this process, a media flow is delivered through the outlet ports, which pushes the object away from the suction plate. The dispensing process can therefore be shortened to an extremely short period of time in the range of milliseconds. In this way, dispensing can occur in a controlled manner in any position of the object unit without deforming it, for example folding or curling it. With uniform distribution of the outlet openings, it can thus be effected that even very flexible objects can be ejected aligned in one plane. The controlled and rapid discharge of the objects, which can be controlled by a control unit by actuating valves by means of which the media flows are switched on or off, also makes it possible to substantially increase the cycle rate at which objects are picked up at a pick-up location and discharged again at a discharge location.

The suction plate can be connected in one piece with the suction body or can be connected to it, possibly by screwing. Preferably, the suction plate is integrally connected to the suction body and separated from it by a circumferential groove. The circumferential groove (see FIG. 4) can also serve to hold the suction unit within a receiving chamber by means of a locking part (see FIG. 3).

The suction body has a one-piece or modular design comprising several suction body modules.

The efficiency of the suction unit can be further improved in that the suction body is connected or connectable to a preferably transparent suction bell, which encloses the suction body separated by a return channel, which opens on one side into the suction basket provided on the suction bell and on another side into at least one outlet opening, which is optionally provided in the wall of the suction bell.

The medium is returned through the return channel and, if necessary, fed back to the compressed air device, resulting in an at least partially closed circuit. Since the gaseous medium in the circuit is always in motion, only a small amount of energy is required to convey it, which conveys the circulated gaseous medium to keep the media flow constant.

The circulation of the gaseous medium also improves its flow behavior. Turbulence and stall are reduced or avoided, so that an increased flow velocity and pressure can develop. In addition, the gaseous medium is guided along the closed circuit at high flow velocity over a longer distance, which is why a reduced suction pressure is built up over a wide range. The suction unit according to the invention can therefore operate with a further reduced pressure, which can be generated for example by a simple blower or fan. Expensive compressed air pumps can thus be dispensed with.

The use of the suction bell not only further increases the efficiency of the suction unit, but also provides additional advantages. The controlled recirculation of the medium prevents disruptive effects on the environment, such as turbulence of object particles or tissue particles or undesirable flows along the treated tissue during a surgical procedure. Furthermore, particles from the production process or contaminants are largely prevented from entering the suction unit.

Preferably, a filter is provided in the suction unit, which prevents impurities from being circulated with the media flow.

The suction basket is preferably integrally connected or optionally connectable with the suction plate or the suction body and/or the suction bell. The suction basket can be screwed to the suction body, connected by an press fit or by other means. For example, the suction basket comprises an annular flange with an internal thread, which can be placed on an external thread on the suction body or on the suction bell.

The suction bell can be connected to the suction body or to a mounting plate optionally connected thereto in one piece or by screws or by means of integrally formed connecting elements, such as threaded elements or elements of a bayonet lock. In this way, a quick release is realized that allows to remove the suction bell in order to clean the suction unit or to put on another suction bell adapted to the manipulated objects or with which the dimensioning of the air ducts or the circulated air flow is adapted.

Suctioning objects is facilitated if they are held centrally and sucked in along the central axis of the suction unit. The suction units are therefore preferably provided with a centering device which allows a suctioned object unit to be guided against the central axis of the suction unit and held in a centralized manner. The centering unit may be connected to the suction body and/or the deflection unit, if provided, and/or the suction basket, if provided, and/or the suction bell, if provided. The centering device may be made of the same material as the base body, the suction basket, the deflection unit, or the suction bell. Furthermore, the centering device can be made of any material, such as metal and plastic.

Inventive suction devices have one or more inventive suction units and preferably comprise a drive device, possibly a robot, by means of which the suction units can be moved between at least one pick-up location and at least one delivery location. The drive device, which is electrically, hydraulically or pneumatically driven, is preferably controllable by means of a control unit, so that the work processes in which the suction units are involved can run automatically. The control unit can be connected to sensors by means of which the work processes can be monitored and the process steps can be correctly timed. Preferably, the processes or the objects, which are preferably held by completely or partially transparent suction units, are monitored by cameras.

In preferred embodiments, the suction device comprises at least one distribution device, which is preferably designed in the form of a cuboid, a cylinder or a cylinder segment, and which holds a plurality of suction units, which are preferably arranged in a uniformly distributed manner and to which compressed air can be supplied jointly via at least one distribution channel or individually via at least one pressure line.

Preferably, the distribution device comprises a plurality of receiving chambers, each of which opened towards the distribution channel through at least one chamber opening and in each of which a suction unit is arranged, which is tightly sealed against the border of the chamber opening by a sealing element, for example a sealing ring. The suction units can therefore be mounted as desired in the receiving chambers and connected to the distribution channel. Preferably, a locking element, for example in the form of a clamp, is provided, which can be inserted into the receiving chamber and positively connected to the suction body of the suction unit in such a way that the suction unit is pressed against the sealing element. By removing or pulling out the locking element, each of the suction units can be easily removed, cleaned and reinserted.

In preferred embodiments, it is provided that a gaseous medium can optionally be introduced into the entry channels of the suction units via a first distribution channel or a first pressure line, respectively.

In further preferred embodiments, the gaseous medium can additionally be introduced optionally into the outlet channels of the suction units via a second distribution channel or a second pressure line, respectively.

By means of the control unit, valves can be controlled in such a way that the gaseous medium is selectively introduced into the entry channels and/or into the outlet channels at the desired time intervals. Preferably, a control program is provided in the control unit which can control the drive device with which the suction units are moved and the media flows by means of which objects are coupled to or decoupled from the suction units.

The suction body, the suction plate, if present the suction basket, which are preferably connected to each other in one piece, and/or the deflection unit are preferably made of an elastic material or transparent material or of an elastic and transparent material, such as acrylic. By using the transparent material, the objects sucked-in by the suction units remain visible and can be monitored by a camera with respect to their condition, dimensions and orientation. Image data from the camera are evaluated, for example in the control unit, and if necessary, compared with patterns so that defective objects can be sorted out. For example, defective objects are transported further and dropped at a collection point by removing the suction pressure and/or ejected by means of compressed air.

The suction body and/or the deflection unit, if provided, and/or the suction basket, if provided, and/or the suction bell, if provided, can be made of the same or different materials, such as metal or plastic. For example, the suction body may be made of plastic and connected or connectable to a suction basket or suction bell made of plastic or metal.

Figure 1B:
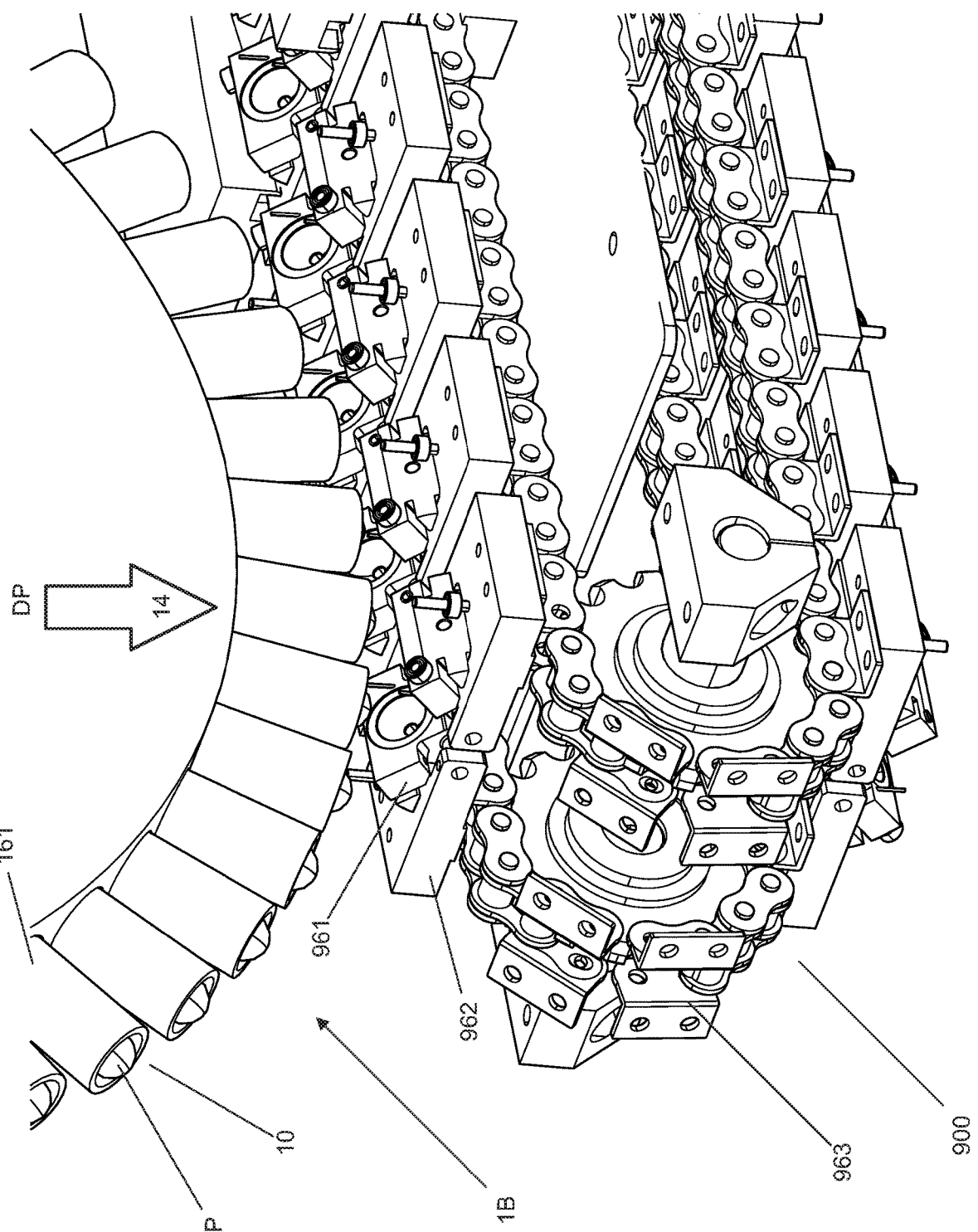
Figures 2C, 2D, 2E, 3:
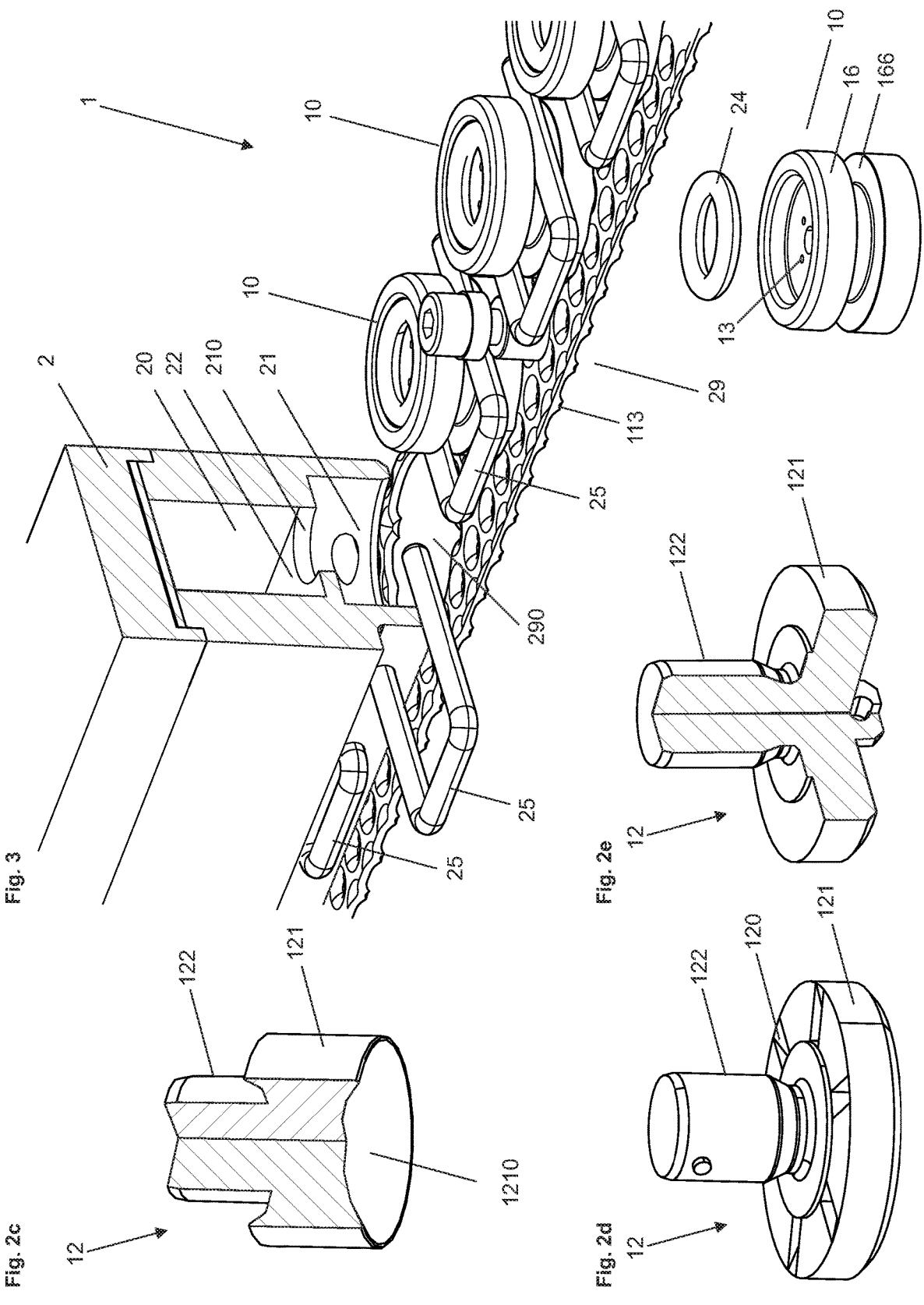
Figures 4A, 4B, 4C:
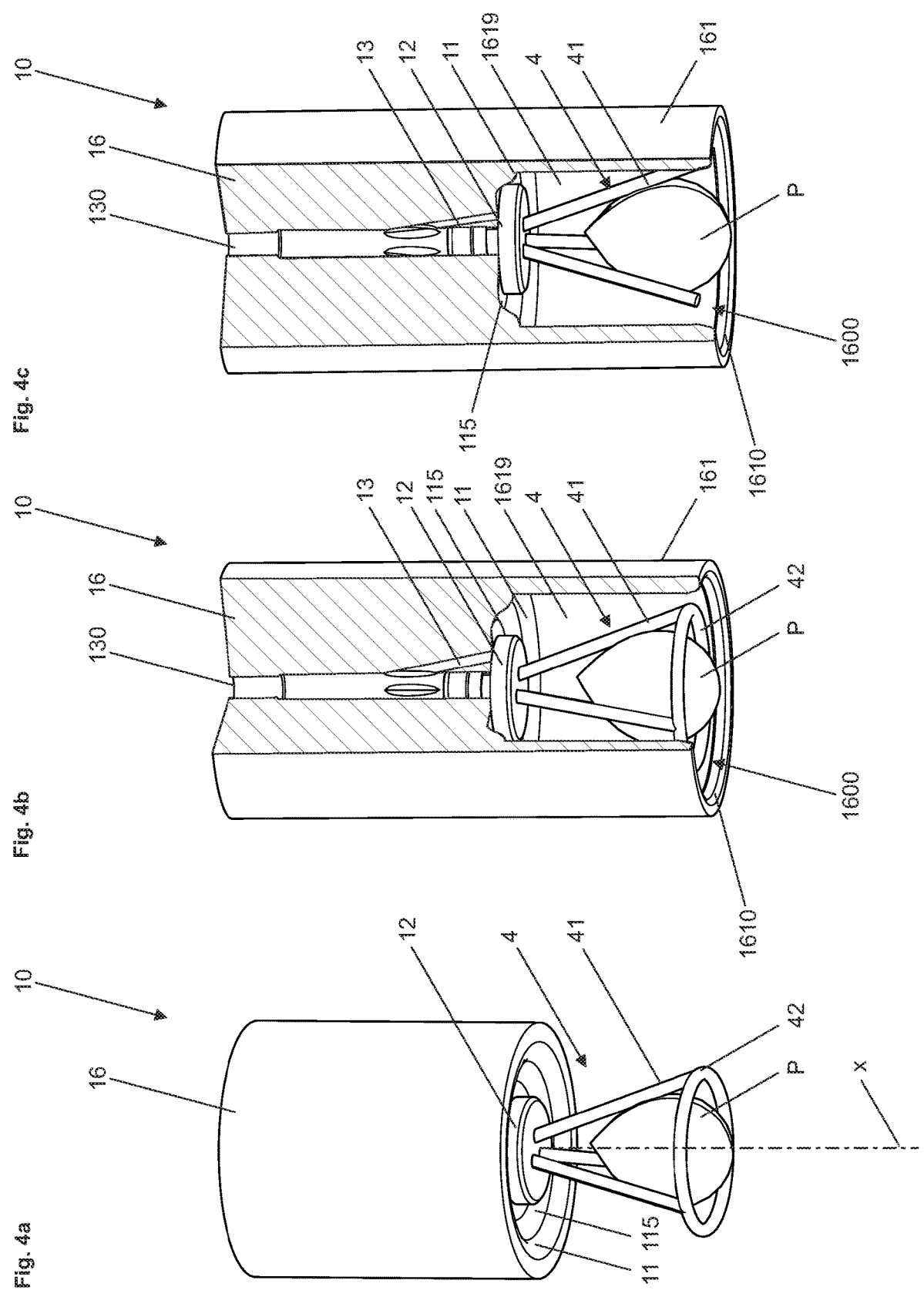
Figures 4D, 4E, 4F:
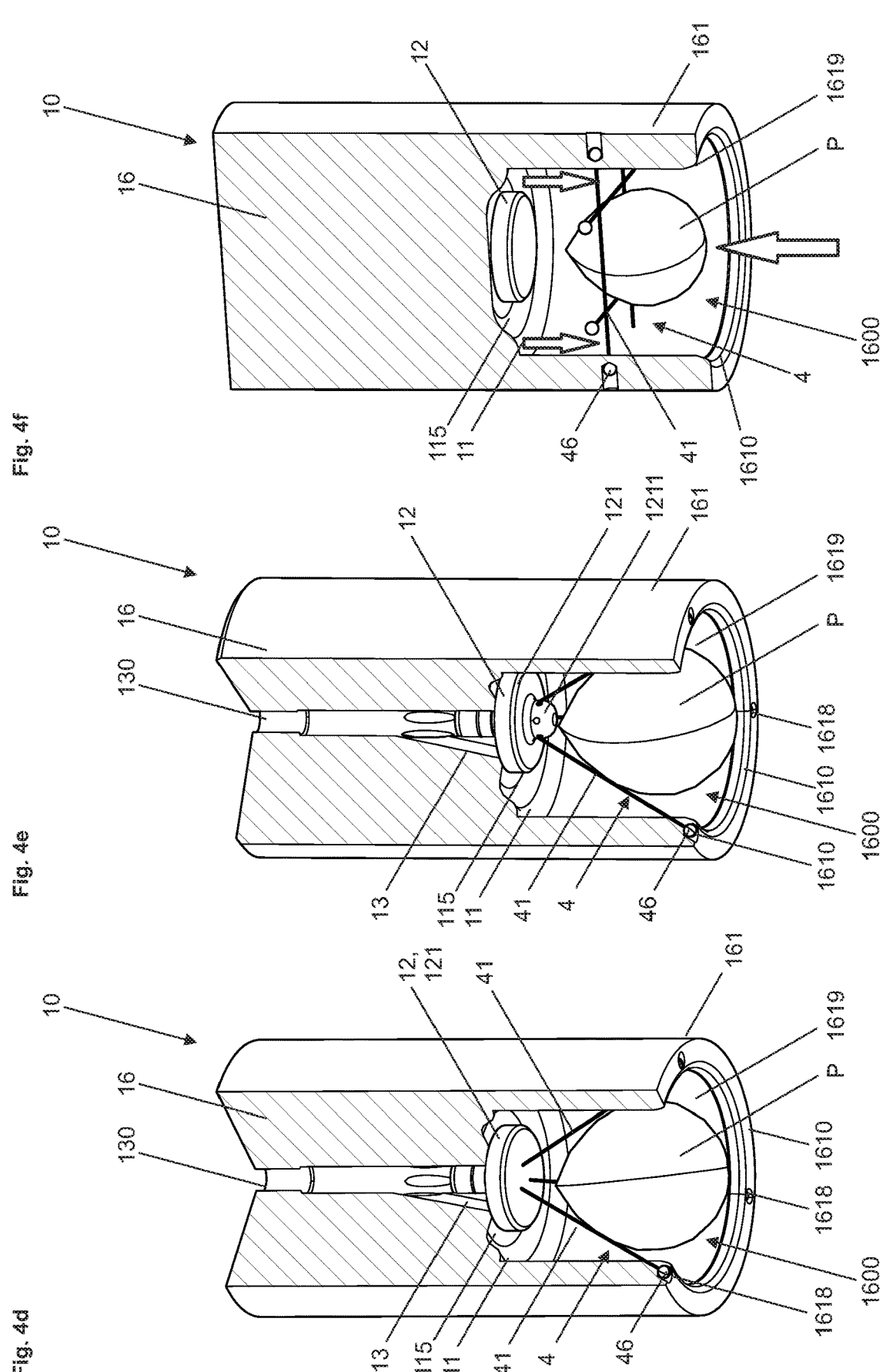
Figures 4G, 4H:
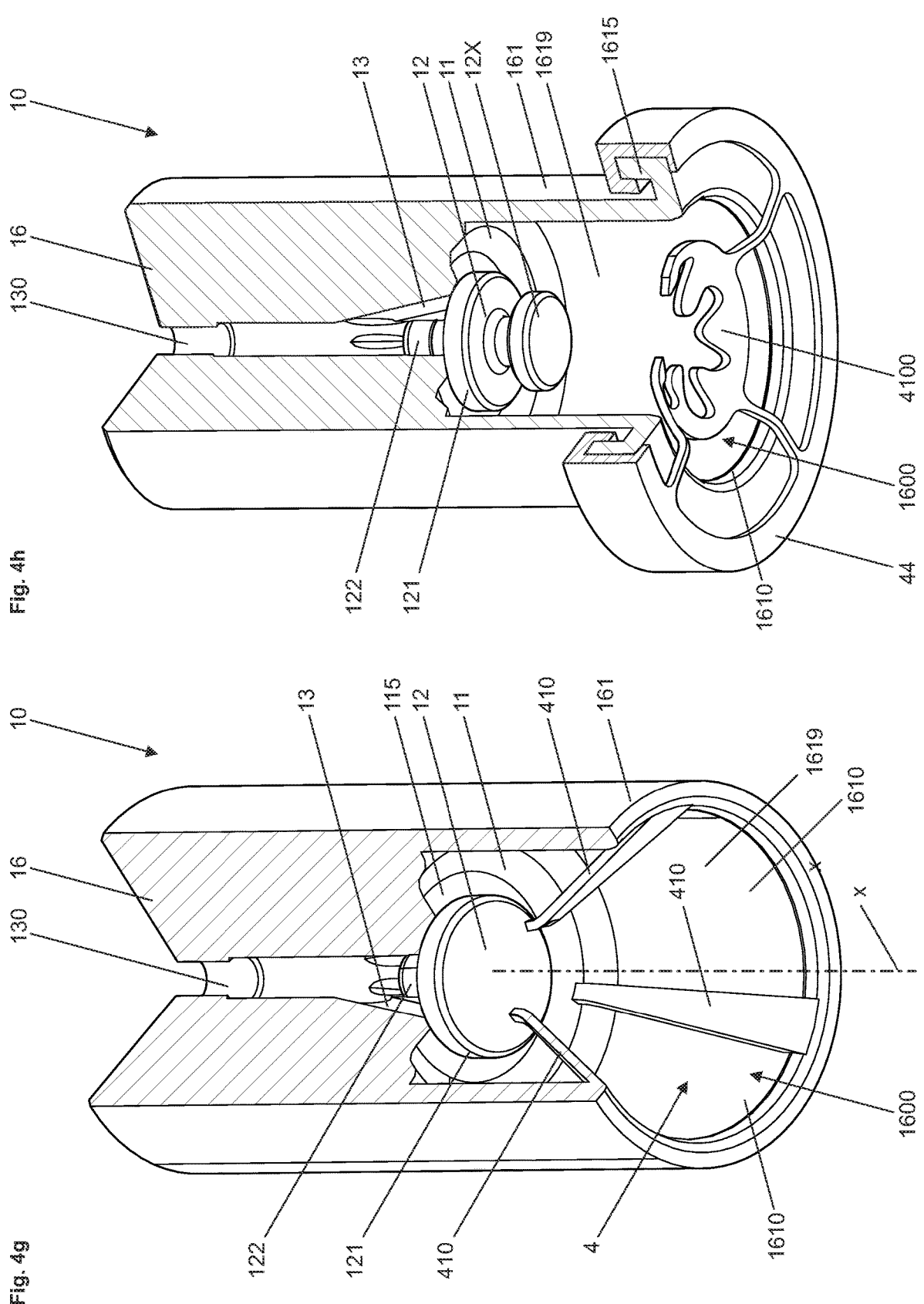
Figures 5, 6:
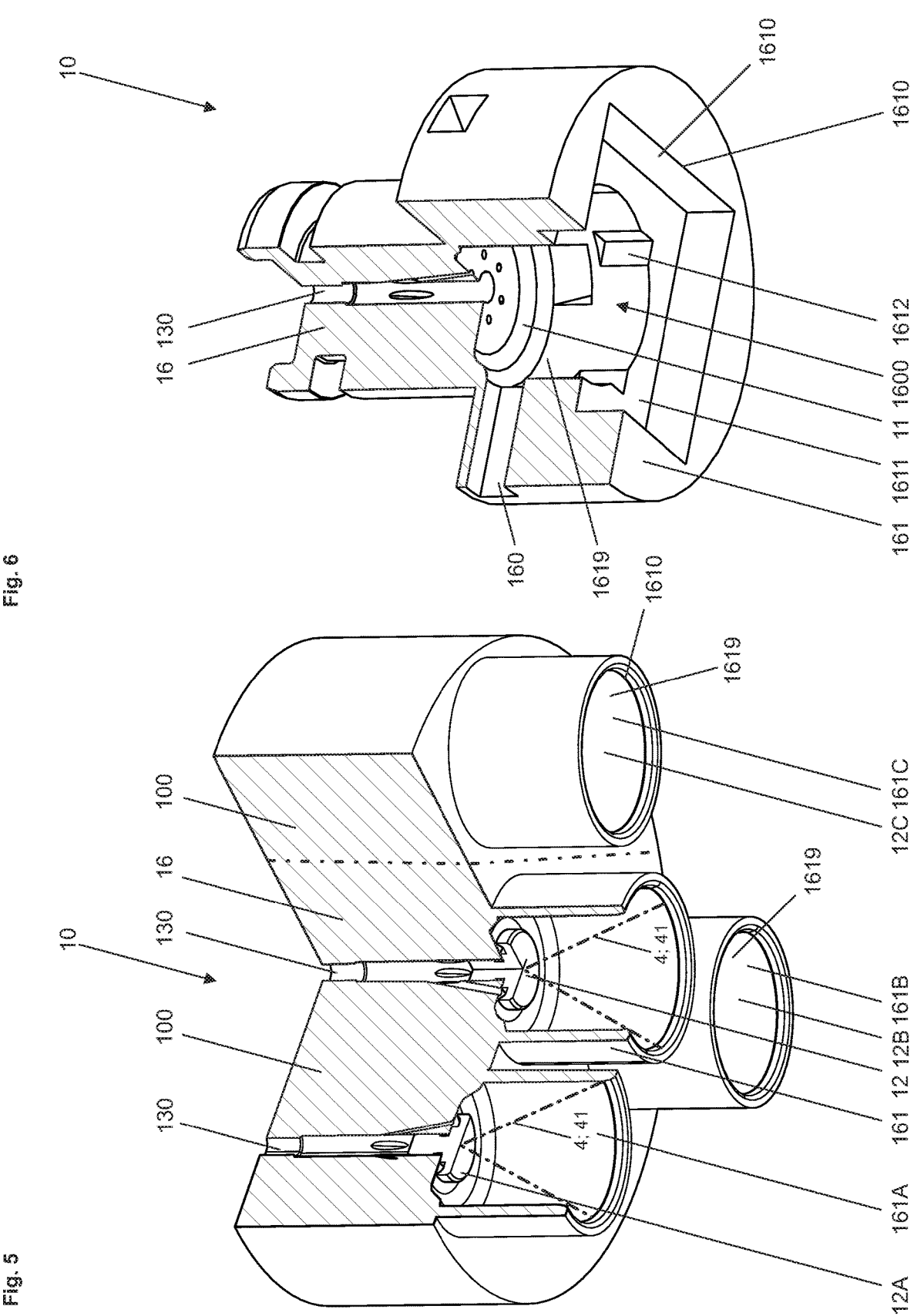
Figures 7A, 7B:
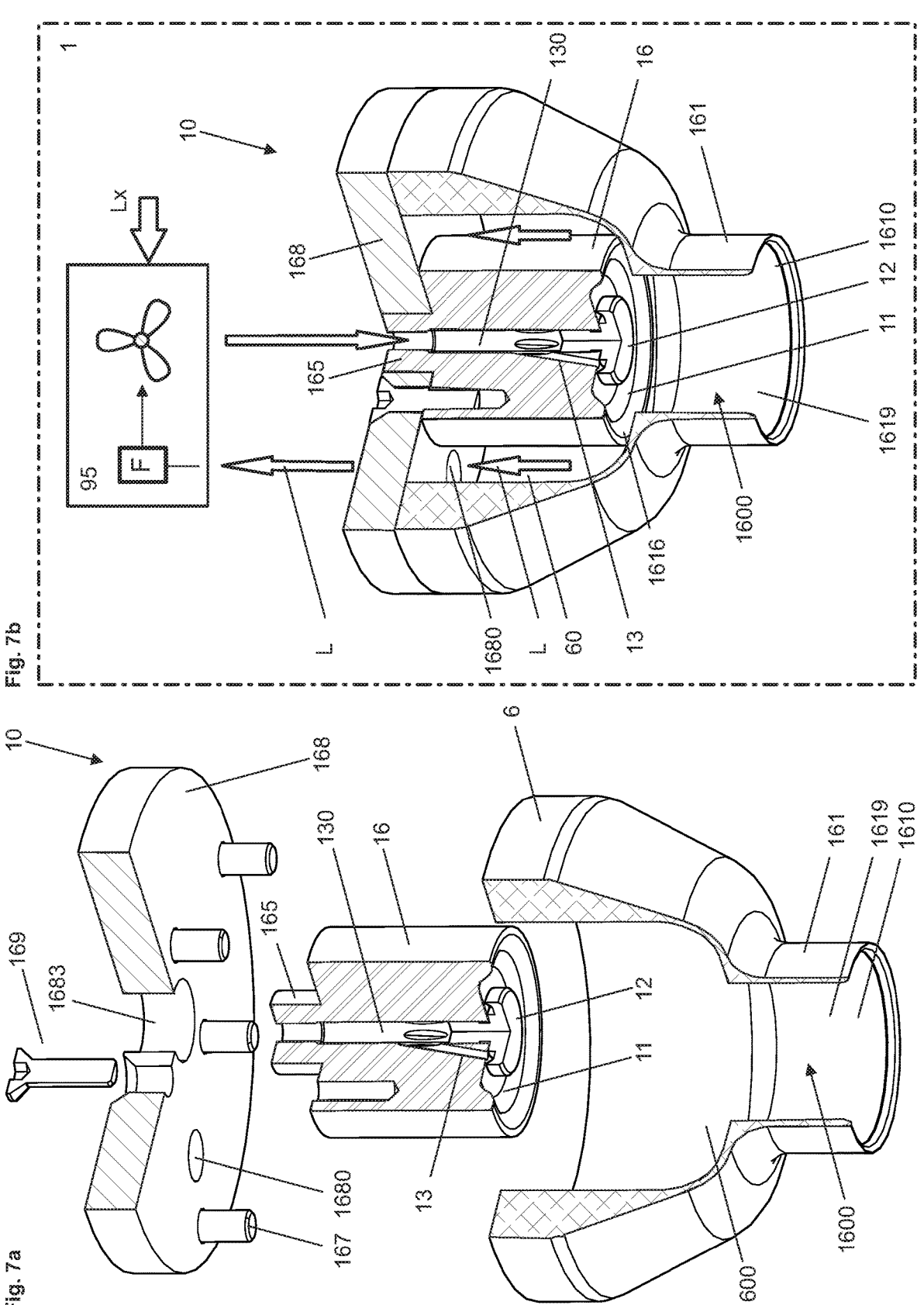
Figures 8A, 8B:
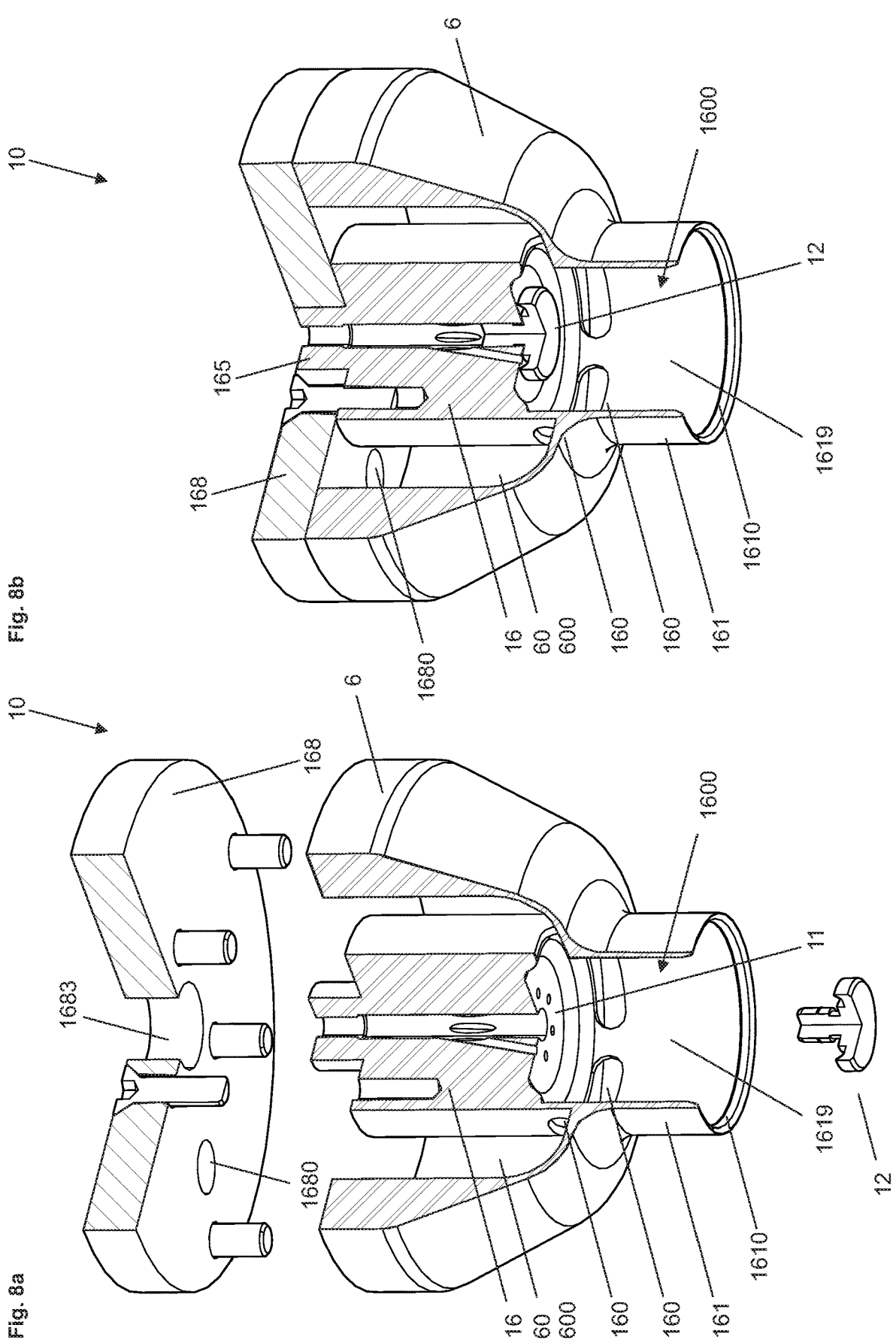
Figures 9A, 9B:
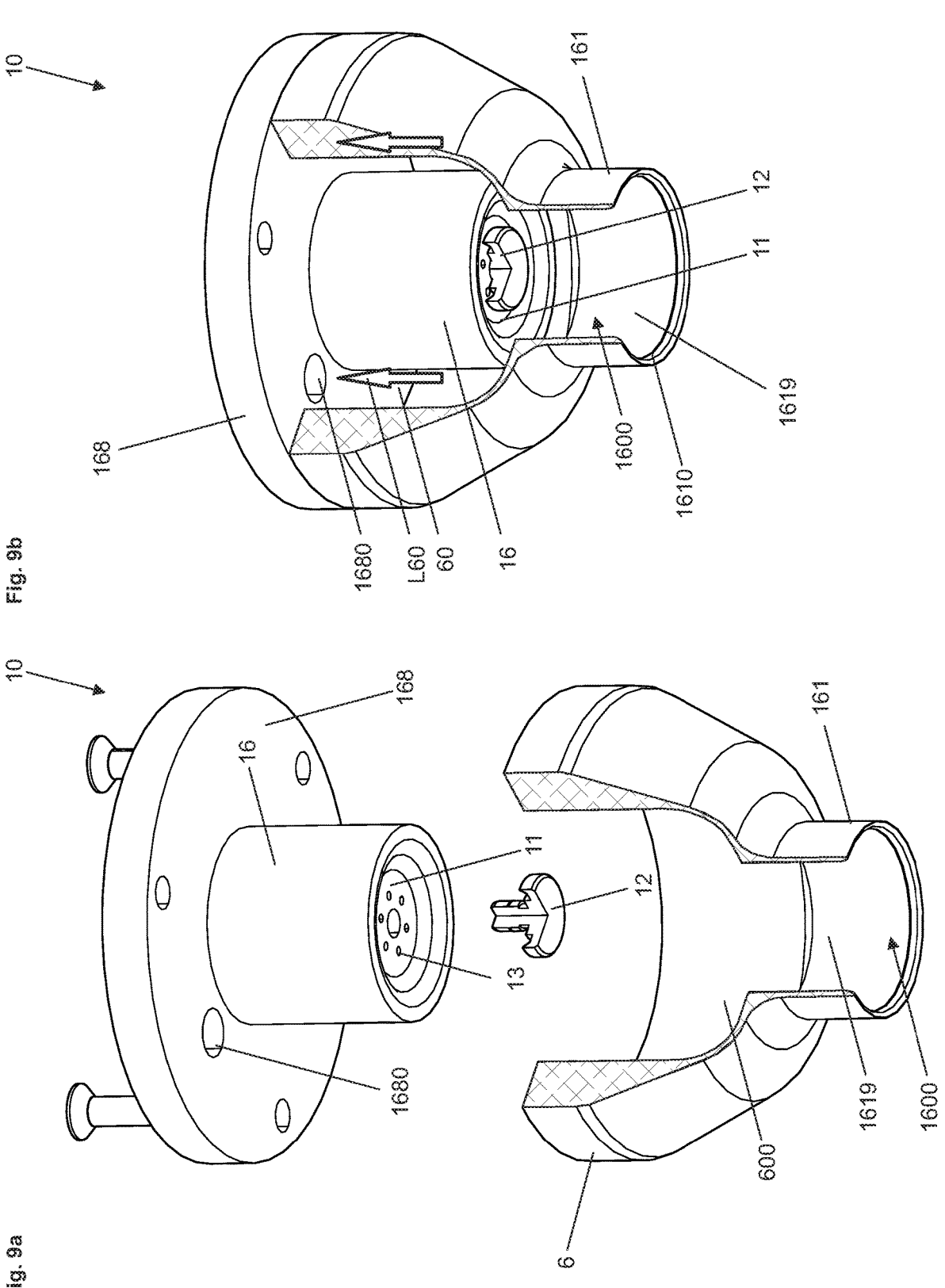
Figures 10A, 10B, 10C:
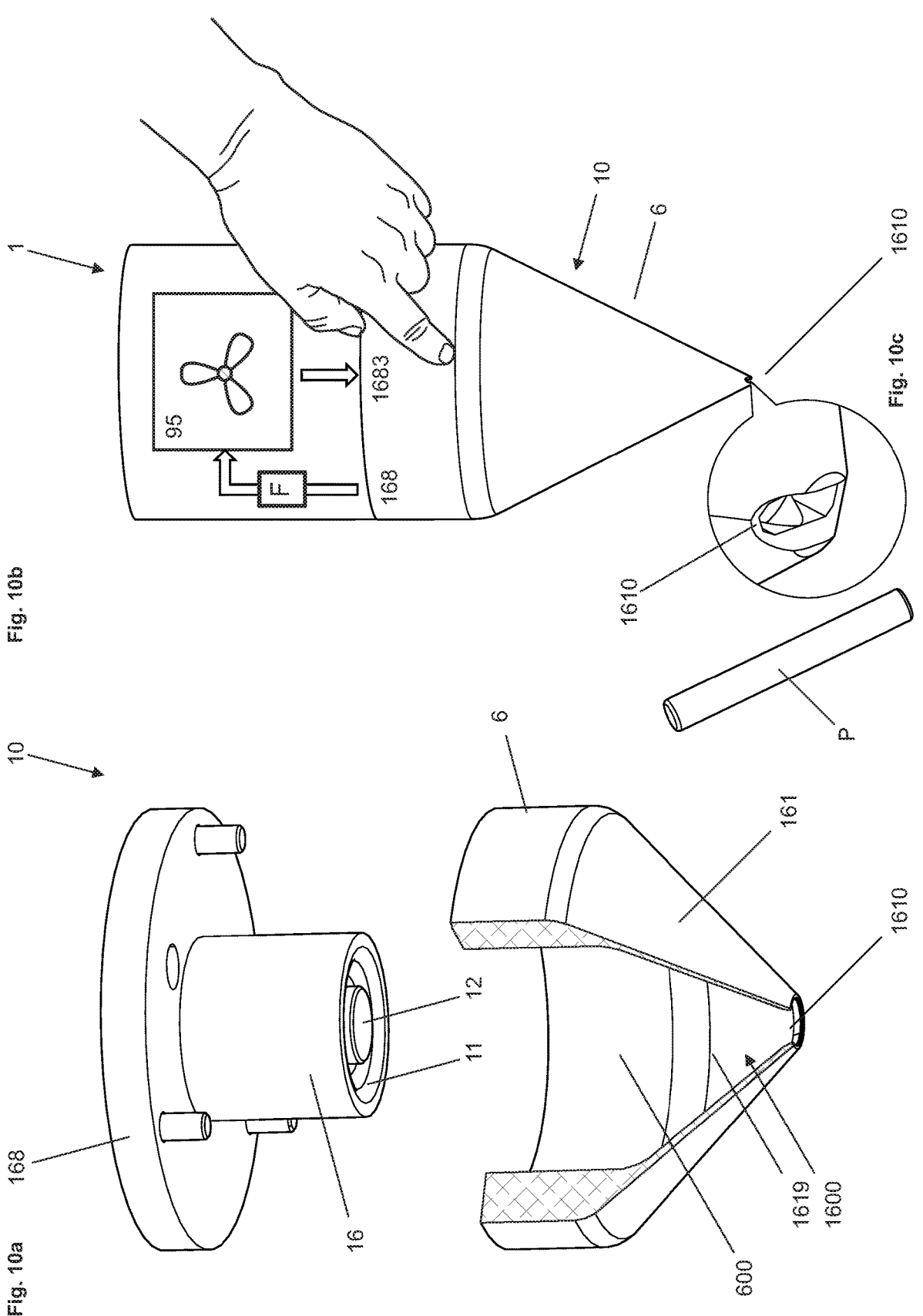
Figures 11A, 11B:
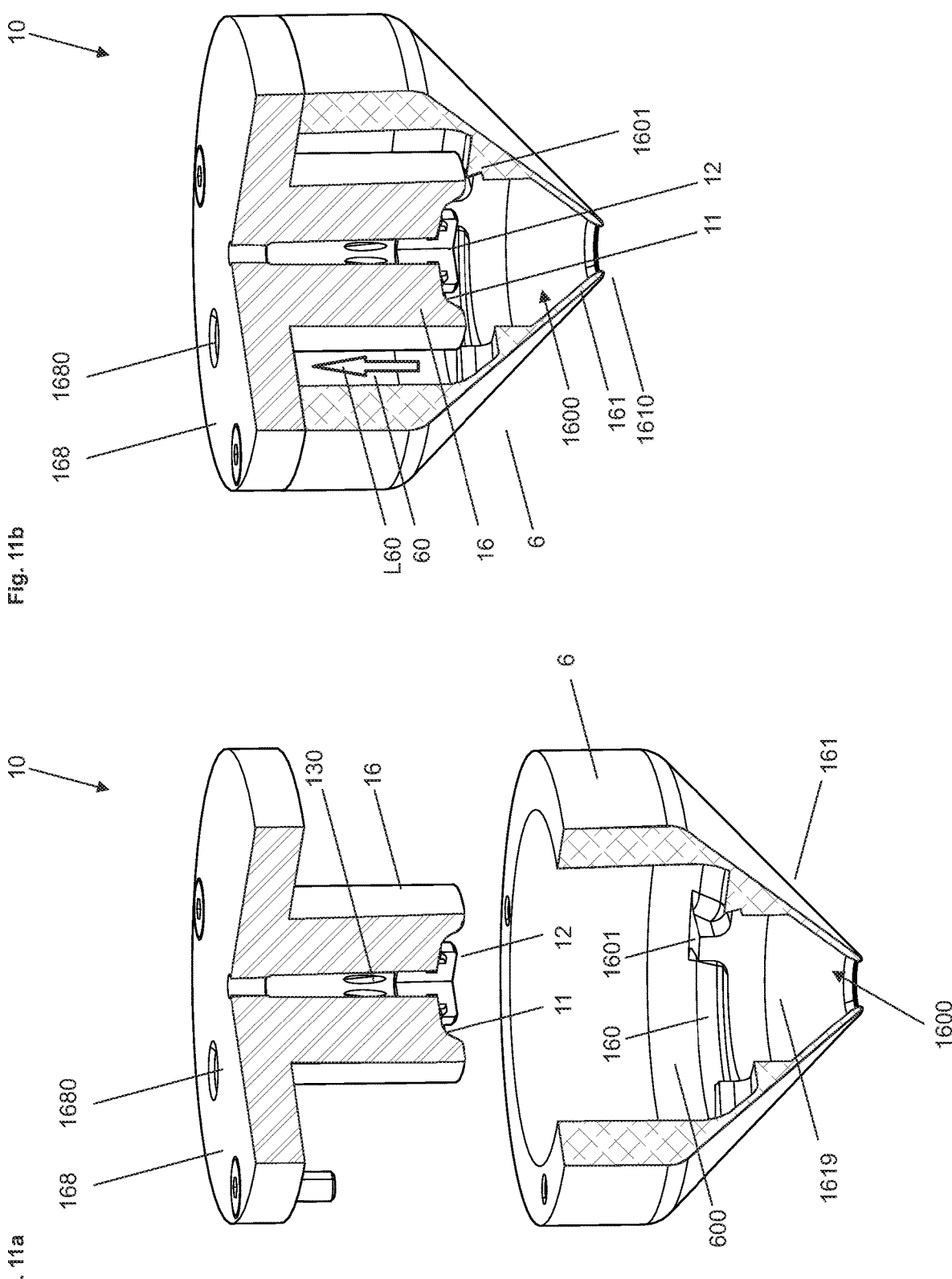
Figures 12, 13:
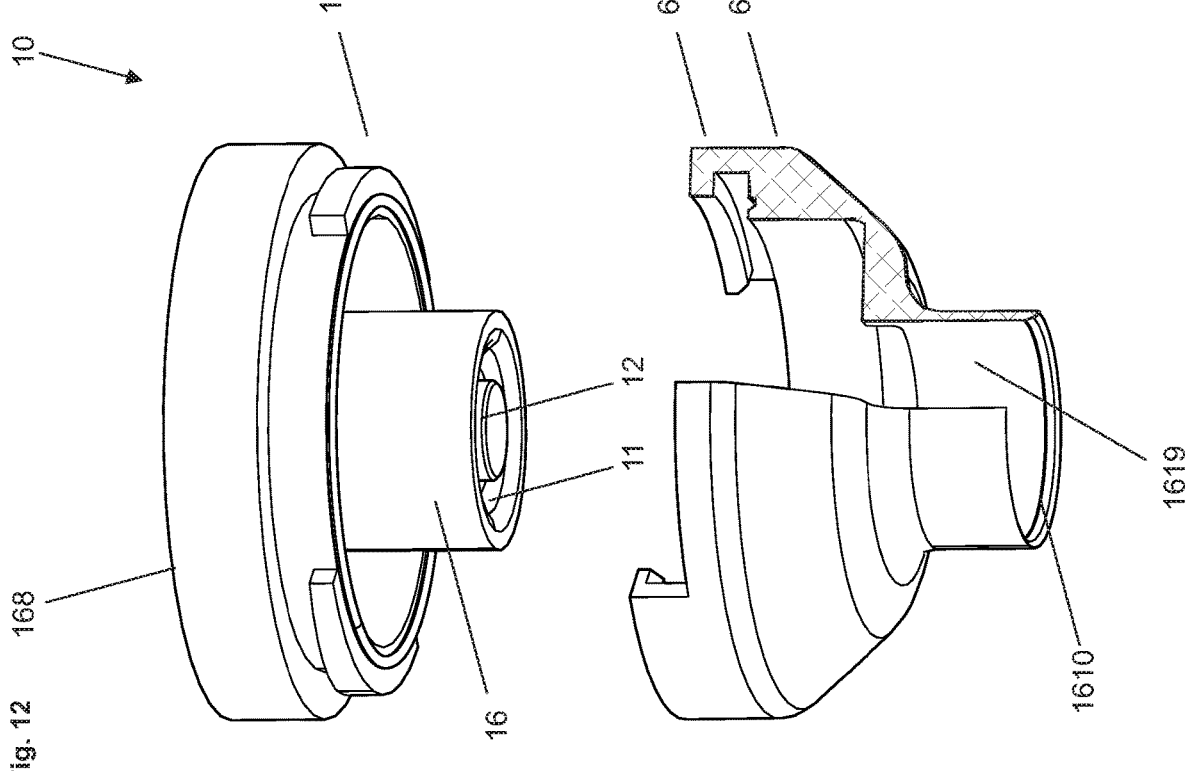
Figures 14, 15:
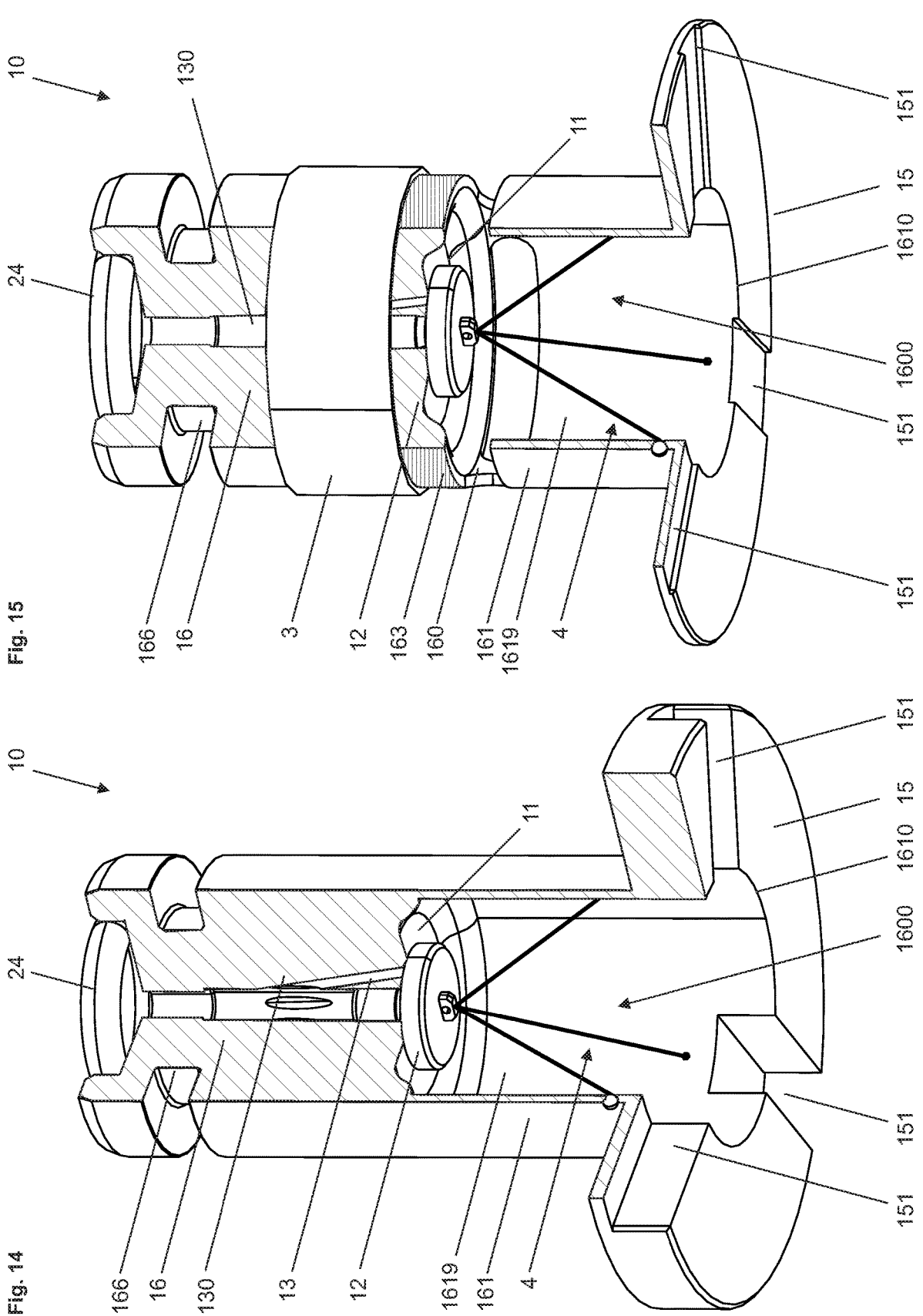
Figures 16A, 16B:
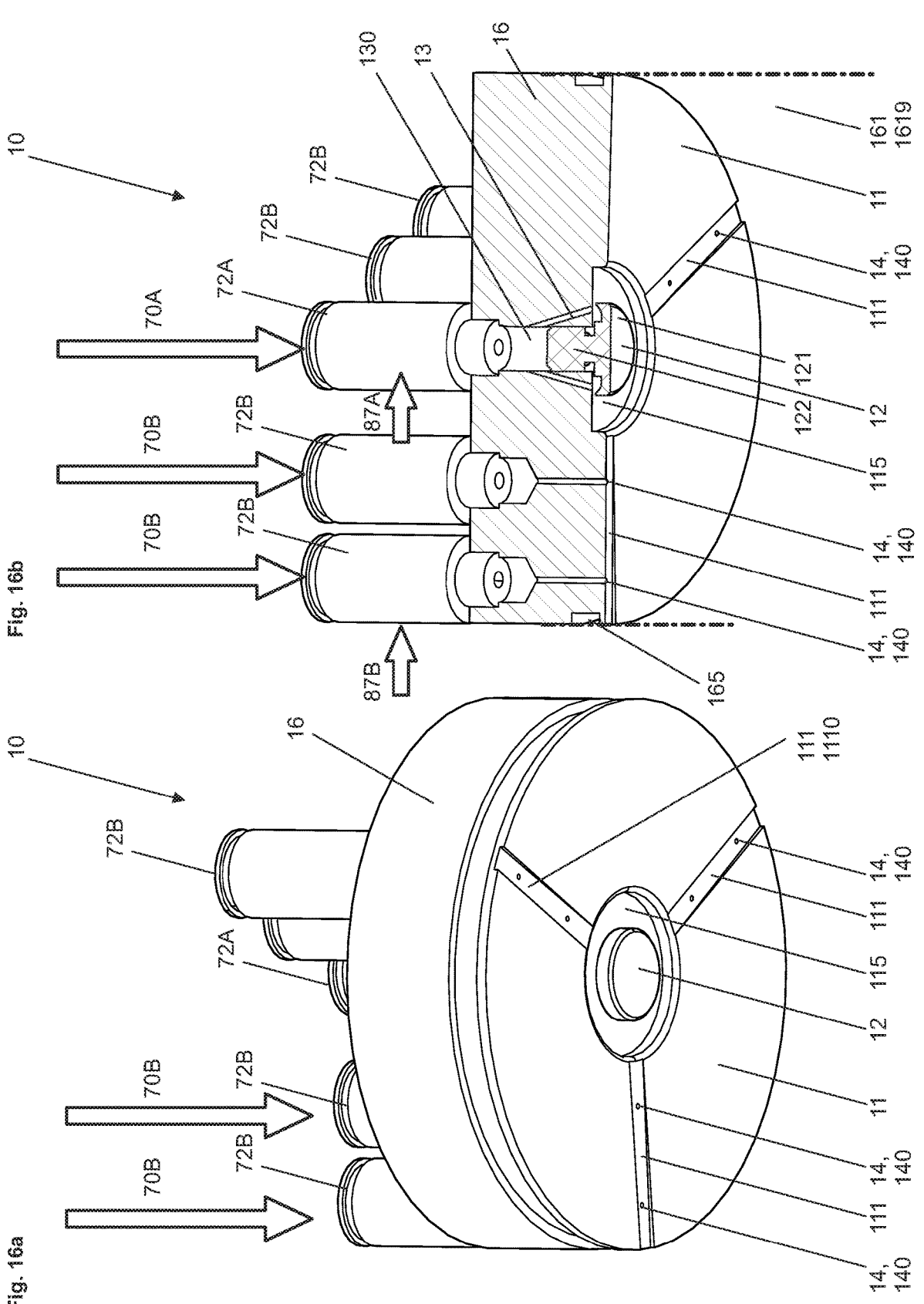

Below, the invention is explained in more detail with reference to drawings. Thereby shows:

FIG. 1a a suction device 1 with two suction wheels 1A, 1B, which are peripherally equipped with suction units 10, for example according to FIG. 2a or 2b, and by which objects P are picked up at a pick-up location and discharged at a discharge location to a conveyor device 6;

FIG. 1b a part of the suction device 1 of FIG. 1a with the second suction wheel 1B, from which objects P are delivered to transport units 961 of the conveyor device 900;

FIG. 2a an inventive suction unit 10 in sectional view with a suction plate 11, to which a suction basket 161 is connected, which encloses a downwardly open receiving channel 1600, with twelve entry channels 13, which are joined to an inlet channel 130 and are directed directly into the edge region of the receiving channel 1600, wherein no deflection unit is provided;

FIG. 2b a suction unit 10 according to FIG. 2a in sectional view with a suction plate 11, which is provided with a deflection unit 12 and to which a suction basket 161 is connected, which optionally has one or more basket openings 160 and encloses a downwardly open receiving channel 1600;

FIG. 2c a deflection unit 12 with a deflection head 121, the underside of which is concave in order to be able to partially receive a sucked-in object;

FIG. 2d a deflection unit 12 with a deflection head 121, the upper side of which is straight and provided with radially extending recesses 120;

FIG. 2e a deflection unit 12 with a deflection head 121, the upper side of which is straight;

FIG. 3 an inventive suction device 1 comprising a plurality of suction units 10 which are arranged in a distribution device 2 and to which compressed air can be supplied, wherein one of the suction units 10 has been removed from a receiving chamber 21 which via a chamber opening 210 is connected to a distribution channel 20;

FIG. 4a a suction unit 10, which is provided with a centering device 4, which is connected to the deflection unit 12 and which allows a sucked-in object unit P to be guided against the central axis x of the suction unit 10 or of the deflection unit 12 and to be held in a centralized manner;

FIG. 4b a suction unit 11 according to FIG. 2a with a suction basket 161, which encloses a receiving channel 1600 without basket openings, and is provided with an optionally provided centering device 4 according to FIG. 4a;

FIG. 4c the suction unit 10 of FIG. 4b with a more simply designed centering device 4, which has three evenly spaced rod-shaped centering elements 41 aligned along a conical surface, which are held by the deflecting unit 12;

FIG. 4d the suction unit 10 of FIG. 4b with a centering device 4, which has three evenly spaced wire-shaped or rope-shaped centering elements 41 aligned along a conical surface, which are held on the one hand by the deflecting unit 12 and on the other hand by the outlet-sided border of the suction basket 161;

FIG. 4e the suction unit of FIG. 4d with a mounting element 1211 on the deflection head 121 of the deflection unit 12, to which the centering elements 41 are attached;

FIG. 4f the suction unit 10 of FIG. 4b with a grid-shaped centering device 4;

FIG. 4g the suction unit 10 of FIG. 4b with a centering device 4, which has three centering elements 41, evenly spaced and aligned along a conical surface, which are held by the outlet-sided border of the suction basket 161;

FIG. 4h the suction unit 10 of FIG. 4b equipped with a holding flange 1615 holding a flange ring 44 with a centering device 4 comprising a blade-shaped holding element 4100;

FIG. 5 a preferably modular suction unit 10 with several suction units 10 according to one of the FIGS. 4b to 4h in sectional view;

FIG. 6 a suction unit 10 according to FIG. 4b in sectional view with a suction plate 11, into which a deflection unit 12 or merely a sealing pin 122 is still to be inserted and to which a suction basket 161 is connected, which optionally has one or more basket openings 160 and encloses a downwardly open receiving channel 1600, which has corresponding recesses 1611, 1612 for receiving objects;

FIG. 7a in exploded view a suction unit 10 with a mounting plate 168, a suction body 16 and a suction bell 6, to which a suction basket 161 is connected;

FIG. 7b the assembled suction unit 10 of FIG. 7a with the suction body 16 inserted in the mounting plate 168 and the suction bell 6, which encloses the suction body 16 separated by a return channel 60 and which is connected to the mounting plate 168;

FIG. 8a the suction unit 10 of FIG. 7a with the suction body 16, which is integrally connected to the suction bell 6 by the suction basket 161 provided with basket openings 160;

FIG. 8b the assembled suction unit 10 of FIG. 8a;

FIG. 9a the suction unit 10 of FIG. 7a with the suction body 16 integrally connected to the mounting plate 168;

FIG. 9b the assembled suction unit 10 of FIG. 9a;

FIG. 10a the suction unit of FIG. 9a with a suction bell 6, which has a conically shaped suction basket 161 with a small channel opening 1610 for gripping small objects;

FIG. 10b a suction device 1 having the suction unit of FIG. 10a with a slit-shaped channel opening 1610 adapted to a rod-shaped object or rod-shaped object unit P;

FIG. 10c the channel opening 1610 of the suction unit 10 of FIG. 10a in enlarged view;

FIG. 11a the suction unit of FIG. 10a with a suction bell 6, which has on the inside a plurality of separating elements 1601, which after assembly of the suction bell 6 connect to the suction body 16 and delimit basket openings 160;

FIG. 11b the assembled suction unit 10 of FIG. 11a;

FIG. 12 the suction unit 10 of FIG. 9a with a suction bell 6 which can be connected by means of a bayonet lock with locking elements 69, 169 to the mounting plate 168;

FIG. 13 the suction unit 10 of FIG. 9a with a suction bell 6 which can be connected to the mounting plate 168 by a threaded lock with locking elements 69, 169;

FIG. 14 a suction unit 10 according to FIG. 2a, but optionally with a deflection unit 12, in sectional view with a suction basket 161, which encloses a downwardly open receiving channel 1600 and which is connected at the top to the suction plate 11 and at the bottom to a ring plate 15, which has lower suction channels 115;

FIG. 15 a suction unit 10 according to FIG. 2b, but optionally with a deflection unit 12, in sectional view with a suction basket 161, which encloses a downwardly open receiving channel 1600 and which is connected at the top to the suction plate 11 and at the bottom to a ring plate 15, which has lower suction channels 115, and wherein the suction basket 161 has a plurality of basket openings 160, which can be covered by means of an adjusting sleeve 3;

FIG. 16a a suction unit 10, preferably connected or connectable to a suction basket 161, in a preferred embodiment with a suction body 16, which holds or is integrally connected to a suction plate 11, in which three radially aligned suction channels 111 are provided, which are displaced by 120° relative to one another and in which the outlet openings 140 of outlet channels 14 are arranged;

FIG. 16b the suction unit 10 of FIG. 16a in sectional view; and

Figure 17:
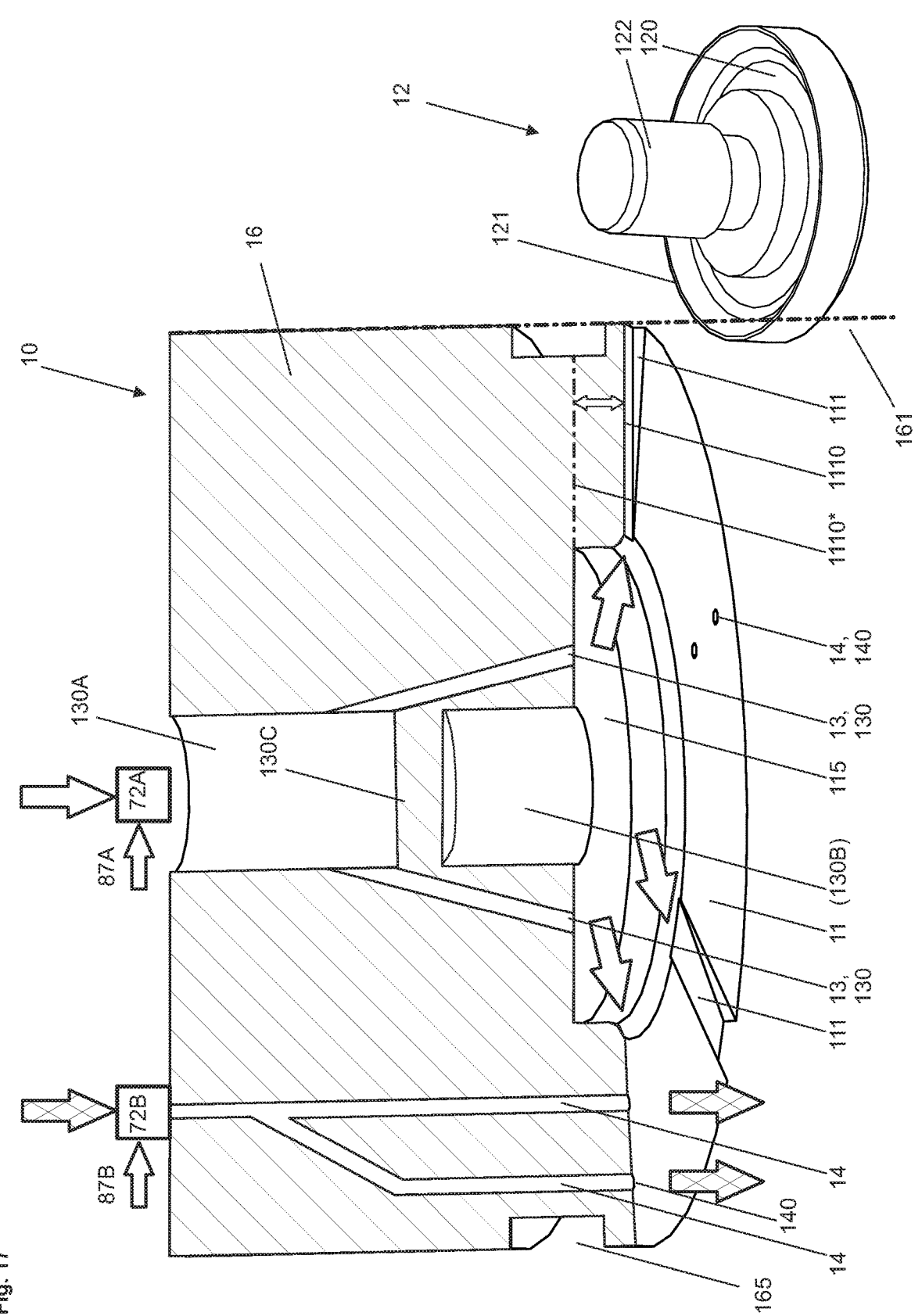

FIG. 17 a suction unit 10, preferably connected or connectable to a suction basket 161, with a suction body 16, in which entry channels 13 and outlet channels 14 and outlet openings 140, which lie between the suction channels 111, and a central bore, which is divided by a partition 130C into an inlet channel 130A and a mounting channel 130B, which serves for the optional mounting of the shown deflection unit 12, which is designed as a body of rotation and for this purpose has a deflection head 121, to which a mounting element 122 is connected.

FIG. 1a shows a suction device 1 with two suction wheels 1A, 1B, which are peripherally equipped with suction units 10 according to one of the following figures and by which objects P are picked up at a pick-up location and delivered to a conveying device 900 at a delivery location. The first suction wheel 1A picks up objects P, for example nuts, from a container B and conveys them to a transfer location, at which the transfer to the second suction wheel 1B takes place, which transports the picked-up object unit P to the delivery location and delivers it there to the conveying device 900. The compressed air supply to each suction unit 10 is preferably individually controllable by a plurality of suction channels 200A, 200B of a distribution device 2 so that an object unit P can be picked up by one suction unit 10 and at the same time an object unit P can be delivered by another suction unit 10. Two pressure lines may also be supplied to each suction unit 10, the first of which is connected to entry channels 13 and the second of which is connected to outlet channels 14, as described with reference to FIG. 17. At the transfer point HO, a suction unit 10 of the first suction wheel 1A, whose object unit P is ejected, and a suction unit 10 of the second suction wheel 1B, which sucks in the object P, are opposite each other.

The control of the drive devices 5A, 5B of the suction wheels 1A, 1B and the valves 72 of the suction channels 200A, 200B is performed by the control unit 8 by means of control signals 81A, 81B; 87A, 87B. The conveying device 900 is controlled by control signals 86 synchronously with the suction wheels 1A, 1B.

A conveying device 95 for the gaseous medium, for example a blower or an air pump, as exemplarily shown in FIG. 7b, can be used inventively for all suction units 10 and suction devices 1 and can be controlled, for example, by the control device 8 by means of control signals 89.

For synchronous control of the device units 1A, 1B, or for checking the position and quality of objects P held by preferably transparent suction units 10, the control unit 8 preferably processes sensor signals S emitted by sensors SM, typically optical sensors or cameras.

FIG. 1b shows a part of the suction device 1 of FIG. 1a with the second suction wheel 1B, from which objects P are delivered at a delivery position to transport units 961 of the conveyor device 900. The transport units 961 are mounted on mounting plates 962 which are conveyed by a chain 963. At the front, the mounting plates 962 are removed. The transport units 961 are formed in two parts and can be opened and closed. On the right side of FIG. 1b a channel is shown into which the transport units 961 are retracted and closed. To ensure that the transported objects P are discharged correctly in terms of time and do not remain in the suction unit 10 or its suction basket 161 for a short time, an air pulse is preferably introduced into the optionally provided outlet channels 14 at the discharge point (see FIG. 17).

FIG. 2a shows an inventive suction unit 10 in sectional view with a suction plate 11, to which a suction basket 161 is connected, which encloses a downwardly open receiving channel 1600. The suction unit 10 comprises a suction body 16 which can be mounted in a device according to FIG. 1a or FIG. 3 and which has twelve entry channels 13 connected to an inlet channel 130 and directed outwardly into the edge region of the receiving channel 1600 against the inside of the suction basket 161. The gaseous medium flowing in through the entry channels 13, which are adjacent to one another and preferably enclose equal angular spacings, is therefore blown against the inner wall of the suction basket 161, where it forms a thin, hollow cylindrical film that flows downward at a high flow velocity. A negative pressure is thus formed in the flow zone, through which an object can be sucked in. It should be noted that the object itself additionally shifts the flow outward and further reduces the flow cross-section, which is why the flow velocity and the negative pressure within the suction basket 161 additionally increase. In this preferred embodiment, a centering device 4 is also provided, by means of which the sucked-in object is kept centered.

Since a thin fast-flowing media film is inevitably formed on the inside of the suction basket 161, a deflection unit 12 is optionally dispensed with in the embodiment of FIG. 2a. The suction plate 11 is therefore tightly sealed in the middle and only has openings for the entry channels 13.

FIG. 2b shows a suction unit 10 preferably according to FIG. 2a with a suction plate 11, to which a suction basket 161 is connected, which encloses an outwardly open receiving channel 1600 and in this embodiment is provided laterally with basket openings 160. The suction basket 161 is integrally connected to the suction body 16, which in turn has a suction plate 11 and a deflection unit 12 at the front. The dimensions of the suction basket 161 are preferably adapted to the objects P. For example, the suction basket 161 is hollow-cylindrical in shape, and if necessary, peripherally conical in shape, so that objects P can be grasped more easily. On the other hand, the suction basket 161 can also have an oval, rectangular or polygonal cross-section.

The basket openings 160 are preferably closable by means of a closing element 3, as shown for the suction unit 10 according to FIG. 15.

The suction units 10 of FIG. 2a and FIG. 2b, which are provided with the suction basket 161, can be used to grasp and securely hold objects P that do not have flat surfaces. For example, nuts, for example hazelnuts, can be grasped and held. The height of the suction basket 161 is dimensioned according to the size of the objects P or a fraction thereof. Preferably, several rows of superimposed basket openings 160 are provided through which the media flow can escape laterally.

The suction basket 161 can also comprise several parts and can be telescopically extendable, for example. Inventive suction units 10 can also be of modular design so that they can be used for the respective applications with or without suction basket 161.

It should be noted that the suction basket 161 of the suction unit 10 of FIG. 2a has no basket openings. In this embodiment, it must therefore remain ensured that when the object is picked up, no stall occurs that would cancel the suction effect. This is ensured in particular by the type of sucked-in objects as well as by the centering unit 4.

In contrast, the suction basket 161 of the suction unit 10 of FIG. 2b has basket openings 160 at different heights. The basket openings 160 ensure that no stall occurs when an object is sucked into the suction basket 161. When the object P enters, the basket openings 160 of different heights are sequentially closed until only the uppermost basket openings 160 are uncovered. In this way, it is ensured that the media film runs as far down as possible and that an optimum suction effect is still achieved as far down as possible. It is also possible to keep only the three uppermost basket openings 160 or wall slots 160 open, but this changes the course of the media film.

The suction body 16 of the suction unit 10 can be fitted with various deflection units 12. The inserted deflection unit 12 is shown in FIG. 17 in a spatial representation.

The deflection unit 12 of FIG. 17, is designed as a mushroom-shaped body of rotation and comprises a deflection head 121 and a pin-shaped mounting element 122 adjoining the deflection head 121. On the side facing the suction plate 11, the deflection head 121 has a circumferential groove-shaped depression 120, which preferably runs rounded towards the edge of the deflection head 121. In a section through the axis of rotation, the deflection unit 12 thus has at least approximately an anchor-shaped cross section. This forms an annular nozzle in which incoming air is guided back against the suction plate 11 and flows along it at high speed.

FIG. 2c shows a deflection unit 12 with a deflection head 121, the underside of which is concave to be able to partially receive and hold centered a sucked-in object P, for example a nut according to FIG. 4a.

FIG. 2d shows a deflection unit 12 with a deflection head 121, the upper side of which is straight and provided with radially extending recesses 120.

FIG. 2e shows a deflection unit 12 with a deflection head 121 whose upper side is straight. By designing the deflection unit 12 and the deflection chamber 115 accordingly, the circular outwardly extending deflection channel 110 can be adapted to the respective requirements.

Inventive suction units 10 can therefore be equipped with the appropriate deflection unit 12.

FIG. 3 shows an inventive suction device 1 with several suction units 10 arranged in a distribution device 2, to which compressed air can be supplied via at least one preferably electronically controllable valve. The compressed air supplied via supply lines is distributed to all suction units 10 via the distribution device 2, which has a distribution channel 20. The at least approximately cuboid distribution device 2, which has a distribution channel 20 and numerous receiving chambers 21, is cut open. The distribution channel 20 is separated from the receiving chambers 21 by a separating plate 22, which has a chamber opening 210 for each of the receiving chambers 21. Compressed air can therefore be supplied through the distribution channel 20 and the chamber openings 210 to the suction units 10 in the receiving chambers 21. The suction units 10 can be inserted in a simple manner into the receiving chambers 21, closely adjacent to the chamber openings 210. A sealing ring 24 is provided on the top of the suction units, tightly adjoining the border of the chamber opening 210 and ensuring that the compressed air can only escape through the suction unit 10. The suction units 10 have a suction body 16 which is enclosed by an annular groove 166. An inserted suction unit 10 can be fixed in a simple manner by means of a fork-shaped clamp 25, which is inserted into the receiving chamber 21 through adapted openings in such a way that it engages in the annular groove 166 of the inserted suction unit 10 and thereby holds it. Suction units 10 can therefore be detached and removed with a single manipulation and, for example, reinserted after maintenance work. A strip 29 is mounted on the underside of the distribution device 2, which has through-openings 290 for the suction units 10 and shaped elements 113 which can engage in the surface of sucked-in objects P and fix them in place.

The inventive suction device 1 can therefore be manufactured, assembled and also maintained in a simple manner.

FIG. 5a shows the suction unit 10 of FIG. 3a with a lamellar elastic suction plate 11. the diameter of the suction body 16 has been reduced and is only slightly larger than the diameter of the receiving chamber 115. the suction plate 11 therefore consists peripherally of a thin annular lamella which can deform and adapt to a held object unit P under the action of the suction force. For this purpose, the suction plate 11, which is preferably integrally connected to the suction body 16, is made of an elastic material. The suction plate 11 can also be a thin metal plate in which the suction channels 111 are formed or stamped. A suction plate of this type can be connected to a centrally arranged sleeve which is connected to the suction body 16, for example glued, screwed or pressed.

FIG. 5b shows the suction unit 10 of FIG. 5a in sectional view.

FIG. 5c shows a sectional view of a preferably designed suction unit 10 with a lamellar suction plate 11, which has suction channels 111 with a constant channel cross-section.

The channel cross-section of the suction channels 111 of inventive suction units 10 can therefore be constant or change as described above. The cross-section at the outlet and at the inlet of the suction channels 111, which have a constant or changing channel cross-section, can be specifically selected. The channel cross-section facing the deflection chamber 115 may be very small. The channel cross-section at the outer end of the suction channels 111 may be unchanged or reduced. In this case, it is possible that the gaseous medium is displaced from the suction channel near the border of the suction plate and must escape between the suction plate and the held object unit in a thin film of medium. In this way, fluttering or detachment of the periphery of the object unit from the suction plate can be avoided. Such an embodiment with peripherally closed suction channels 111 is preferably provided for objects that have a very low inherent stability and should be peripherally secured.

FIG. 5c further shows that the underside of the deflection head 121 of the deflection unit 12 and the front side of the suction plate 11 are aligned at least approximately in one plane. In this way, a suctioned object unit P is supported in a plane so that it cannot deform. If desired, the deflection unit 12 can also be displaced inwardly so that it deviates, for example, a fraction of a millimeter from the plane defined by the front side of the suction plate 11.

Schematically, it is further shown that the mounting element 122 of the deflection unit 12 has a formation which serves to lock the mounting element 122 in the central bore 130. Preferably, the formation is annular and surrounds the mounting element 122 with a thickness, for example, in the range of $\frac{1}{10}$ mm-$\frac{1}{100}$ mm. Several such sealing rings may also be provided, by means of which the mounting element 122 is locked in the inlet channel 130.

FIG. 4a shows a suction unit 10 which can preferably be connected to a suction basket 161 and which is provided with a centering device 4 which is connected to the deflection unit 12 and which allows guiding an sucked-in irregular, for example round, object unit P against the central axis x of the suction unit 10 or of the deflection unit 12 and keeping it centered.

The suction unit 10 in turn comprises a deflection unit 12, by which the centering device 4 is held. Centering devices 4 are preferably funnel-shaped so that objects picked up are automatically guided upwards along the funnel axis x. To ensure that air circulation is not interrupted, open or air-permeable centering devices 4 are used.

The centering device 4 shown comprises three centering elements 41 aligned along a cone, which at one end form the cone tip held by the deflection unit 12 and which are connected to one another on the other side by a receiving ring 42. By means of the receiving ring 42, an object unit P, for example a nut, can be pre-centered so that it can subsequently be more easily sucked along the centering elements 41 against the deflection unit 12 and centered. The effect of the centering device 4 is that the object P is held centrally and the gaseous medium can flow over it in the manner of an umbrella. The suction force can therefore develop uniformly, whereby the object can be held securely.

FIG. 4b shows a suction unit 11 with a suction basket 161, which has no lateral basket openings and which encloses a receiving channel 1600, and with an optionally provided centering device 4 as shown in FIG. 4a. The suction basket 161 ensures that the gaseous medium can flow laminarly downwards or outwards along its cylindrical inner wall, whereby a uniform cylindrical medium flow is forcibly created and a negative pressure results in the center of the receiving channel 1600, which ensures the safe suction even of objects P of an unfavorable shape.

By means of the centering device 4, it is again ensured that the object P is centered and does not come into disturbing contact with the media film. Without the centering device 4, the suction of the objects P would also succeed advantageously, whereby the reliable capture of the objects P could take somewhat longer.

FIG. 4c shows the suction unit 10 of FIG. 4b with a more simply designed centering device 4, which has three evenly spaced rod-shaped centering elements 41 aligned along a conical surface and held by the deflecting element 12. A retaining ring 42 has been dispensed with. The centering elements 41 are aligned in a straight line. In preferred embodiments, however, the centering elements are bent slightly outwardly so that they can securely grip objects P in a wider environment.

FIG. 4d shows the suction unit 10 of FIG. 4b with a centering device 4, which has three evenly spaced wire-shaped or rope-shaped centering elements 41 aligned along a conical surface, which are held on one side by the deflecting unit 12 and on the other side by the outlet-sided border of the suction basket 161. The centering elements 41 are anchored at one end in the deflection element 12 or in the deflection head 121 and are provided on the other side with a mounting ball 46, which is anchored in a mounting opening 1618 on the outlet side in the border of the suction basket 161.

FIG. 4e shows the suction unit 10 of FIG. 4d with a mounting element 1211 on the deflection head 121 of the deflection unit 12, to which the centering elements 41 are attached.

FIG. 4f shows the suction unit 10 of FIG. 4b with a grid-shaped centering device 4, which has grid rods or grid cables as centering elements 41, which are anchored in the suction basket 161 with mounting balls 46. In this embodiment, the hollow-cylindrical media flow is shown running downward in the receiving channel 1600 along the cylindrical basket wall and generating a negative pressure in the region of its central axis, along which an object unit P, for example a nut, is guided against the centering device 4.

FIG. 4g shows the suction unit 10 of FIG. 4b with a centering device 4, which has three evenly spaced centering elements 41 aligned along a conical surface, which are held by the outlet-side border of the suction basket 161 and are inclined with their ends towards the central axis x. The centering elements 41 form an open funnel, which ensures that objects P are not guided against the inner wall of the suction basket 161.

FIG. 4h shows the suction unit 10 of FIG. 4b equipped with a holding flange 1615, which holds a flange ring 44 with a centering device 4 comprising a blade-shaped holding element 4100. This centering device 4 can be used to advantageously hold lighter and less dimensionally stable objects. It is also possible to use a shorter suction basket 161. The flange connection can also be used in the embodiment of FIG. 6i.

The centering devices 4 can be made entirely or partially of metal or plastic. The parts can be of strong or elastic design, whereby care must be taken, for example by design, that objects P do not become jammed in the centering device 4 and can be released again without difficulty.

FIG. 5 shows in sectional view a preferably modular suction unit 10 with several suction units 10 according to one of the FIGS. 2a, 2b, 4b to 4h, each of which is provided with a deflection unit 12, 12A, 12B, 12C and a suction basket 161, 161A, 161B, 161C. In each suction basket 161, 161A, 161B, 161C, a centering device 4 with centering elements 41; 42 is preferably provided, which can be designed as desired in order to optimally grip and center objects P.

The suction unit 10 allows to pick up and deliver several objects P at the same time. Often, objects P should be picked up in a certain pattern and/or delivered again, if necessary to an intermediate product or to a packaging. Since intermediate products and packaging often change, inventive suction units 10 are preferably provided modular and assembled as desired. For example, suction body modules 100 are provided which are connected to each other positively, non-positively, or otherwise, optionally screwed to each other. Where appropriate, suction body modules 100 are provided with one or more deflection units 12 and suction plates 11, which can be assembled in the manner of LEGO® modules. In this way, for example, the suction head of a robot can be arbitrarily adapted to intermediate products and packaging. For example, a suction head is assembled with suction units that allow to be grasped in a pattern and inserted into provided chocolate. For example, the suction unit 10 is designed in such a way that chocolate can be provided with several nuts in a single operation during the manufacturing process.

FIG. 6 shows a suction unit 10 according to FIG. 2b in sectional view with a suction plate 11, into which a deflection unit 12 or merely a sealing pin 122 is to be inserted and to which a suction basket 161 is connected. The suction basket 161 optionally has one or more basket openings 160 and encloses a downwardly open receiving channel 1600 which has corresponding recesses 1611, 1612 for receiving objects. Exemplarily, it is shown that rectangular objects of different sizes can be received in the recesses 1611, 1612. For example, first an object is received in the upper recess 1612 and subsequently an object is received in the lower recess 1611. Provided that the pick-up channel 1600 is closed by one of the objects, the media flow can flow outwardly through the basket openings 160, thereby maintaining the suction pressure. The number and configuration of the recesses 1611, 1612 may be optional. The basket openings 160 are to be designed accordingly and, if necessary, to be connected to one another by channels.

FIG. 7a shows a suction unit 10 in exploded view with the suction body 16, a mounting plate 168 and a suction bell 6, to which a suction basket 161 is connected. In this embodiment, the suction body 16 is connectable to a mounting plate 168 by screws or bolts 167. The mounting plate 168 has a transfer channel 1683, into which a nozzle 165 formed on the suction body 16 and connected to the mounting channel 130 can be inserted. Further, the mounting plate 168 has an outlet opening 1680.

The suction bell 6, which can also be connected to the mounting plate 168 by screws or bolts 167, has a bell chamber 600 into which the suction body 16 can be inserted. The suction basket 161, which encloses the suction channel 1600, adjoins the underside of the suction bell 6. The suction basket 161 can therefore be integrally connected or connectable to the suction body 16 or to the suction bell 6.

FIG. 7b shows a suction device 1 with the assembled suction unit 10 of FIG. 7a with the suction body 16 inserted into the mounting plate 168 and the suction bell 6, which encloses the suction body 16 separated by a return channel 60 and which is connected to the mounting plate 168. The suction body 16 is connected only to the mounting plate 168 and projects into the bell chamber 600 in such a way that the suction plate 11 is separated from the suction basket 161 only by an annular slot 1616 and that between the inner wall of the suction bell 6 and the suction body 16 only the return channel 60, which is dimensioned as desired and encloses the suction body 16 annularly, is kept free.

From an air pressure device or media pressure device 95, a medium L can therefore be circulated through the suction unit 10, which generates a negative pressure in the suction basket 161. The medium L discharged by the media pressure device 95 runs through the inlet channel 130 and the entry channels 13 of the suction body 16 to the deflection head 12 and is guided there through a deflection channel 110, over the suction plate 11, through the annular slot 1616, the return channel 60 and the at least one outlet opening 1680 back to the media pressure device 95. Dirt particles can be removed from the media flow in an optionally provided filter F, which is provided within the circulation circuit, preferably in the blower 95.

Due to the circulation of the medium, only little energy and hardly any external medium Lx has to be supplied to the media pressure device 95. The suction device 1 and the suction unit 10 operate with maximum efficiency. At the same time, the medium L is not fed to the outside, thus avoiding undesirable effects on the work process and process materials. The suction bell 6 also encloses the suction unit 10, which is why foreign materials can hardly penetrate the suction unit 10; this is particularly the case when the channel opening 1610 is adapted to the objects P to be sucked in.

The suction device 1 is shown schematically and can be designed as a tool that is moved manually, by a robot or by another drive device.

FIG. 8a shows the suction unit 10 of FIG. 7a with the suction body 16, which in this embodiment is integrally connected to the suction bell 6 by the suction basket 161. The suction basket 161 is provided between the suction body 16 and the wall of the suction bell 6 with slit-shaped basket openings 160, through which the gaseous medium is guided back to the outlet opening 1680 through the return channel 60.

FIG. 8b shows the assembled suction unit 10 of FIG. 8a. Due to the one-piece production of the suction body 16 and the suction bell 6, the suction unit 10 can be manufactured more economically and more precisely.

FIG. 9a shows the suction unit 10 of FIG. 7a with the suction body 16 integrally connected to the mounting plate 168. FIG. 9b shows the assembled suction unit 10 of FIG. 9a. Due to the one-piece production of the suction body 16 and the mounting plate 168, the suction unit 10 can be manufactured cost-effectively and precisely.

FIG. 10a shows the suction unit of FIG. 9a with a suction bell 6, which has a conically shaped suction basket 161 with a small channel opening 1610 for gripping small objects. The suction basket 161 can thus be of any shape and advantageously adapted to the working environment. The suction basket 161 can also taper disproportionately or concavely downward. The suction basket 161 can for example be rotationally symmetrical or approximately elliptical in cross section.

FIG. 10b shows a suction device 1 with the suction unit of FIG. 10a with a slit-shaped channel opening 1610, which is adapted to a rod-shaped object P. Due to this adaptation, objects P can be safely grasped with high suction pressure without further particles being sucked in from the working area. The sucked-in object closes the adapted channel opening 1610. The high efficiency of the suction units allows the use of a cost-effective and energy-efficient blower 95, which drives the medium through the suction unit 10. The suction device 1, which is designed as a hand tool, can be used for example for surgical purposes to manipulate tissue or surgical tools.

FIG. 10c shows the channel opening 1610 in enlarged view.

FIG. 11a shows the suction unit of FIG. 9a with a suction bell 6, which has several separating elements 1601 on the inside, which connect to the suction body 16 after assembly of the suction bell 6 and delimit basket openings 160. FIG. 11b shows the assembled suction unit 10 of FIG. 11a. In this embodiment, suction bells 6 can be easily fabricated with basket openings 160 sized as desired. The separator elements 1601 can be formed wide to define narrow basket openings 160 or can be formed narrow to define wide basket openings 160.

FIG. 12 shows the suction unit 10 of FIG. 9a with a suction bell 6 that can be connected to the mounting plate 168 by a bayonet lock with corresponding locking elements 69, 169. FIG. 13 shows the suction unit 10 of FIG. 9a with a suction bell 6, which can be connected to the mounting plate 168 by a screw closure with corresponding closure elements or threaded elements 69, 169. These suction units 10 can be easily assembled and reopened to perform maintenance.

FIG. 14 shows a suction unit 10 according to FIG. 2a, but optionally with a deflection unit 12, in sectional view with a suction basket 161, which encloses a downwardly open receiving channel 1600 and which connects at the top to the suction plate 11 and at the bottom to a ring plate 15, which has lower suction channels 151.

FIG. 15 shows a suction unit 10 according to FIG. 2b, but optionally with a deflection unit 12, in sectional view with a suction basket 161, which encloses a downwardly open receiving channel 1600 and which is connected at the top to the suction plate 11 and at the bottom to a ring plate 15, which has lower suction channels 151. The suction basket 161 has basket openings 160 which can be completely or partially covered by means of a closing element 3, preferably an adjusting sleeve 3. The adjusting sleeve 3, which encloses the suction basket 16, preferably has an internal thread corresponding to an external thread on the outside of the suction basket 16. The threaded sleeve can therefore be easily rotated to close the basket openings 160 as required. The suction unit 10 can therefore be adapted to objects to be picked up as required.

The ring plate 15 of the suction units 10 of FIG. 14 and FIG. 15, which adjoins the channel opening 1610 of the suction basket 161, allows objects to be picked up in a controlled manner into the suction basket 161 or to the border or channel opening 1610 of the suction basket 161. When the suction units 10 are lowered onto an object, the object is held centered by means of the ring plate 15 or the radial flow of the medium along the underside of the ring plate 15 and can be lifted vertically in a controlled manner. The lower suction channels 151 again ensure a constant flow of medium when an object is contacted and sucked in. The suction channels 115 again have a cross-section or a cross-sectional shape adapted to the objects to be picked up. Within the pick-up channel 1600, a centering device 4 is optionally provided, for example with four threads or wires, by means of which the object can be held centered.

FIG. 16a shows an inventive suction unit 10 in a preferred embodiment with a suction body 16 holding a suction plate 11, in which three radially aligned suction channels 111 displaced by 120° relative to one another are provided. By dash-dotted lines it is shown that the suction unit 10 is connected or connectable to a suction basket 161. The suction unit 10 can therefore optionally be used with or without suction basket 161 to suck in different objects. Without suction basket 161, for example according to FIG. 16a, flat objects are sucked in. With suction basket 161, for example as shown in FIG. 16b, voluminous objects can be sucked in.

FIG. 16b shows a sectional view of the suction unit 10 of FIG. 16a, which is designed as a rotating body. The suction plate 11 is integrally connected to the suction body 16, which is made, for example, of a plastic, and is slightly offset therefrom by a circumferential annular groove 166, which is preferably used for mounting the suction unit 10.

The suction body 16 has an inlet channel 130 coaxial with the axis of rotation, from which several entry channels 13 branch off. A deflector unit 12, as shown in FIG. 17, is inserted from below with the mounting element 122 into the inlet channel 130 so that the inlet channel 130 is closed at the front and the gaseous medium or compressed air can only reach the front of the suction plate 11 through the outwardly extending entry channels 13.

The suction plate 11 has a preferably cylindrical recess which serves as a deflection chamber 115. The outlet openings of the entry channels 13 are arranged within the deflection chamber 115 behind the deflection head 121 of the deflection unit 12, so that the inflowing medium can be introduced to the rear side of the deflection head 121 and from this into a deflection channel 110, which is delimited on the one hand by the front side of the suction plate 11 and on the other hand by the rear side of the deflection head 121, if the deflection unit 12 has been inserted. If no deflection unit 12 has been inserted, the deflection channel 110 is delimited by the sucked-in object. The gaseous medium is guided radially outward through the deflection channel so that it can flow out through three suction channels 111 on the one hand and between the suction plate 11 and a suctioned object unit (not shown) on the other hand, causing a corresponding negative pressure.

The suction channels 111 are radially extending recesses within the suction plate 11 and extend from the deflection chamber 115 preferably to the outer edge of the suction plate 11. After the suction of an object unit P, it is therefore always ensured that the medium can escape through the suction channels 111, which are preferably open on the outlet side, and that the desired suction effect is always ensured along the suction channels 111, irrespective of the nature of the sucked object unit P.

Preferably, a plurality of uniformly distributed suction channels 111 is provided. A particularly advantageous arrangement comprises three evenly distributed suction channels 111, which for example run radially outward and are offset from each other by 120°.

Preferably, several evenly distributed entry channels 13 are provided. Particularly advantageous are six or more evenly distributed entry channels 13, which are inclined outward and offset from each other by 60°. In this embodiment, the entry channels 13 define a pyramid with a corresponding number of edges.

FIG. 16*b* further shows that optional outlet channels 14 provided in this embodiment pass through the suction body 16 with outlet openings 140 arranged within the suction channels 111.

Exemplarily, it is shown that compressed air can be introduced through a pressure line 70A and a first valve 72A into the inlet channel 130 and further into the entry channels 13 and through pressure lines 70B and second valves 72B into the outlet channels 14. The decentrally arranged valves 72A, 72B can be controlled by the control unit 8 (see FIG. 1*a*) by means of control signals 87A, 87B. Optionally, therefore, compressed air can be passed at desired time intervals through the entry channels 13 to suck in an object unit P or into the outlet channels 14 to push off the object unit P held. The elements 72A, 72B shown may also be simple connection elements through which compressed air is supplied to the suction unit 10. In this case, valves are provided centrally, allowing simpler electrical wiring of the control lines 87A, 87B.

By introducing compressed air through the outlet channels 14 directly into the suction channels 111, a pressure can be quickly built up there over a relatively large area, by means of which the held object unit P is repelled.

FIG. 17 shows a preferably designed suction unit 10, which can optionally be equipped with one of the above-described deflection units 12 and is fixedly or detachably connected to a suction basket 161 (symbolically shown by a dashed line).

The suction body 16 is provided with outlet channels 14 and outlet openings 140 located between the suction channels 111. It is also possible to arrange the outlet openings 140 inside and outside the suction channels 111. The suction channels 111 and the deflection chamber 115 are optional and preferably provided when the suction unit 10 is also used without the suction basket 161. For example, the suction basket 161 is detachably connected to the suction body 16 by a thread or by an press fit.

Symbolically, the course of the media flows controlled by valves 72A, 72B is shown.

The cross-section of the suction channels 111 is clearly visible in this illustration. At the channel inlet adjacent to the deflection chamber 115, the channel cross-section has a minimum size which increases by a factor of 5 to 10 up to the channel outlet. Such a course allows the diameter of the suction plate 11 to be increased and, during operation without a suction basket, larger objects P, possibly also heavier ones, to still be held securely. The dimensioning of the suction channels 111 with the course of depth and width can be adapted to the nature of the objects P as required. The cross-sectional course can be constant or increase or decrease radially outward. Dashed dots indicate that the bottom 1110, 1110\* of the suction channels 111 can be lowered to the height of the bottom of the deflection chamber 115 so that the height of the deflection chamber 115 corresponds approximately to the depth of the suction channels 111. In this case, the transition from the deflection chamber 115 to the suction channels 111 is stepless and the gaseous medium can flow away unhindered.

In this preferred embodiment, the suction body 16 has a central bore which is divided by an intermediate wall 130C into two parts 130A, 130B which are completely separate from one another. Compressed air can be introduced via a valve 72A, which is shown schematically, into the upper part 130A of the central bore, from which preferably six entry channels 13 branch off. The lower part 130B of the central bore forms a mounting opening 130B into which the mounting element 122 of the deflection unit 12 can be inserted.

The lower part 130B can also be completely filled, so that no deflection unit 12 can be used. Alternatively, a pin can also be inserted detachably in the mounting opening 130B. If no deflection unit 12 is used, the depth of the suction channels 111 is preferably increased.

The function of the outlet channels 14 and the suction channels 111, which are only optionally provided, has been explained with reference to FIG. 16*a*.

The suction units 10, as described above with reference to the drawings, are supplied with compressed air via at least one line from a media pressure device 95, a blower or a pump. All inventive suction devices 1 and suction units 10 can advantageously be operated with a blower 95, which for example comprises a propeller. It has been shown that reducing the diameter of the inlet channel 130 and/or the entry channels 13 connected thereto can paradoxically increase the suction power or suction force of the suction units 10. By using a blower device instead of a pump, the cost of the suction device 1 is significantly reduced. If necessary, two or more blowers can be connected in series to increase the pressure.

Inventive suction units with an adapted inlet channel can already be operated with a medium pressure in the range of 1 bar. The use of expensive piston pumps can thus be avoided.

In order to select the optimum suction power of one of the above-described suction units 10 in conjunction with a connected blower 95 or a unit of blower devices, the diameter of the inlet channel 130 and/or of the entry channels 13 adjoining it is changed until objects P with maximum weight can be captured. In preferred embodiments, it is provided that between the suction plate and the inner wall of the suction basket there is a transition extending along a curve, optionally along a circular line.

The invention claimed is:

1. A suction unit, suitable for suctioning an object according to Bernoulli's principle, comprising:

a suction body with an adjoining suction plate, which adjoining suction plate has a front side facing away from the suction body, and at least one entry channel, through which a gaseous medium is introducible through the suction body to the front side of the suction plate into a deflection channel, which deflection channel is delimited on one side by the front side of the suction plate and on another side by a deflection head of a deflection unit, and through which deflection channel the gaseous medium is guidable to the outside, the at least one entry channel comprising a plurality of entry channels branch off from a central inlet channel that passes partially or completely through the suction body, the suction plate is equipped with the deflection unit, which comprises the deflection head at which the gaseous medium entering through the at least one of the plurality of entry channels is forwarded radially uniformly or non-uniformly into the deflection channel, wherein the deflection unit is detachably connected to the suction body, and the deflection head is adjoined by a pin-shaped mounting element which at the suction plate is detachably inserted the central inlet channel, which extends completely through the suction body or into a mounting channel located in the suction body adjoining the suction plate, wherein the suction body is integrally or detachably connected to a suction basket whose inner side adjoins the suction plate or whose inner side is spaced apart from the suction plate, wherein the suction basket encloses a receiving channel which has a channel opening that is dimensioned in such a way that individual objects can be introduced into the receiving channel or into at least one recess on the underside of the suction basket.

2. The suction unit according to claim 1, wherein the suction body has a longitudinal axis and in that a plurality of entry channels are provided which are arranged at regular or at irregular distances from one another and which extend inside the suction body inclined to the longitudinal axis or along a curve outwards towards the suction plate.

3. The suction unit according to claim 1, wherein the suction basket comprises one or more basket openings arranged regularly or irregularly in one or more rows spaced from each other.

4. The suction unit according to claim 3, wherein an adjustable closure element is connected to the suction basket, by means of which at least one of the basket openings can be closed completely or partially.

5. The suction unit according to claim 1, wherein the suction body is connected to a suction bell, which suction bell encloses the suction body separated by a return channel, which return channel opens on one side into the suction basket provided at the suction bell and on another side into at least one outlet opening provided in the wall of the suction bell or in a mounting plate which integrally or detachably connects the suction bell and the suction body to one another.

6. The suction unit according to claim 1, wherein the channel opening of the suction basket is enclosed by an annular plate which is aligned perpendicularly or inclinedly with respect to the suction basket and, on the underside facing away from the suction basket, has suction channels which are recessed into the annular plate and have a constant or changing cross-sectional profile.

7. The suction unit according to claim 1, wherein one or more outlet channels extend through the suction body to outlet openings, which are distributed inside the suction channels, outside the suction channels or inside and outside the suction channels, through which a gaseous medium can be guided in the direction of the suction plate.

8. The suction unit according to claim 1, wherein a centering device is provided within the suction basket and is connected to the deflection unit, the suction body or the suction basket.

9. The suction unit according to claim 1, wherein at least one of the parts of the suction unit is made of a transparent material.

10. The suction device with at least one suction unit according to claim 1 with a medium pressure device for generating a flow of a gaseous medium, which is guidable through the suction unit or is guidable through the suction unit and is returnable to the pressure device through a return channel.

11. The suction device according to claim 10, wherein a distribution device is provided, which is designed in the manner of a block, a cylinder or a cylinder segment, and which holds a plurality of uniformly distributed suction units, to which compressed air can be supplied jointly via at least one distribution duct or individually via at least one pressure line.

12. The suction device according to claim 11, wherein the distribution device comprises receiving chambers, each of which receiving chambers is open towards the distribution channel through at least one chamber opening and in each of which receiving chambers a suction unit is arranged, which rests in a tightly sealing manner against the border of the chamber opening by means of a sealing ring and which is releasably held in abutment against the sealing ring by means of a locking element.

\* \* \* \* \*